US012692879B1

(12) United States Patent
Keener

(10) Patent No.: US 12,692,879 B1
(45) Date of Patent: Jul. 28, 2026

(54) SUBMERSIBLE PUMP WITH EXTERNAL SLICER

(71) Applicant: Gregg Keener, Ashland, OH (US)

(72) Inventor: Robert Keener, Ashland, OH (US)

(73) Assignee: Gregg Keener, Ashland, OH (US)

( * ) Notice: Subject to any disclaimer, the term of this patent is extended or adjusted under 35 U.S.C. 154(b) by 136 days.

(21) Appl. No.: 18/413,422

(22) Filed: Jan. 16, 2024

Related U.S. Application Data

(60) Provisional application No. 63/440,977, filed on Jan. 25, 2023.

(51) Int. Cl.

| | |
|---|---|
| ***F04D 29/70*** | (2006.01) |
| ***B02C 18/00*** | (2006.01) |
| ***F04D 7/04*** | (2006.01) |
| ***F04D 13/08*** | (2006.01) |
| ***F04D 29/22*** | (2006.01) |
| ***F04D 29/42*** | (2006.01) |

(52) U.S. Cl.
CPC ........ *F04D 29/708* (2013.01); *B02C 18/0092* (2013.01); *F04D 13/086* (2013.01); *F04D 29/2288* (2013.01); *B02C 2201/063* (2013.01); *F04D 7/045* (2013.01); *F04D 13/08* (2013.01); *F04D 29/4293* (2013.01)

(58) Field of Classification Search
CPC .... F04D 7/045; F04D 29/2288; F04D 13/086; F04D 29/708; F04D 13/08; F04D 29/4293; B02C 18/0092; B02C 2201/063
See application file for complete search history.

(56) References Cited

U.S. PATENT DOCUMENTS

| | | | | |
|---|---|---|---|---|
| 8,366,384 B2 * | 2/2013 | Sodergard | ............. | F04D 29/628<br>415/121.1 |
| 9,475,059 B2 * | 10/2016 | Vallen | ................... | B02C 18/062 |
| 10,267,312 B2 * | 4/2019 | Pohler | ........................ | F04D 1/00 |
| 11,253,866 B2 * | 2/2022 | Bäcke | ................. | F04D 29/2288 |
| 11,512,701 B2 * | 11/2022 | Wang | ...................... | B02C 18/18 |
| 2019/0321827 A1 * | 10/2019 | Bäcke | ................... | E03C 1/2665 |

* cited by examiner

*Primary Examiner* — Peter J Bertheaud
(74) *Attorney, Agent, or Firm* — Ralph E. Jocke; WALKER & JOCKE

(57) ABSTRACT

An exemplary pump apparatus (10) includes a housing (12) that houses a motor (34) and includes a pump chamber (40). A drive shaft (36) is in operative connection with the motor and rotates an impeller (42) positioned in the pump chamber and a slicer (30) that is positioned in outwardly overlying relation of a slicer plate (54). The slicer plate includes a plurality of fluid openings (78) through which liquid flows to reach the pump chamber. The slicer includes a plurality of blade edges (102) that are enabled to be precisely positioned a desired clearance distance away from a generally planar slicer face (80). The clearance distance is accurately set without having to disassemble the pump, by an adjustment mechanism including adjusting screws (114). The slicer plate is readily replaceable and the fluid openings therethrough have a configuration that provides efficient slicing action by the slicer of solid material suspended in the liquid entering the pump.

30 Claims, 23 Drawing Sheets

SUBMERSIBLE PUMP WITH EXTERNAL SLICER

TECHNICAL FIELD

Exemplary arrangements relate to pumps suitable for pumping liquid material. Exemplary arrangements specifically relate to submersible pumps that are usable for pumping sewage or other material including solids therein. Exemplary arrangements include an external slicing mechanism for reducing the size of solids before they enter the interior of the pump.

BACKGROUND

The movement of liquid material is important in many types of processes. The movement of liquid often requires one or more pumps that cause the liquid to move between locations. The reliability of pumps to move liquids is critical to assuring that problems and damage to systems are avoided.

The pumping of a liquid becomes more challenging when the liquid includes suspended solids therein. Suspended solids that are of a large size, hard and/or comprised of resilient material may cause clogging, binding or damage to a pump resulting in pump failure. The pumping of sewage is often particularly challenging due to the various types of solid materials that may be suspended in the waste flow.

Liquid pumps may benefit from improvements.

SUMMARY

Exemplary arrangements relate to submersible pumps that may be utilized for pumping liquid materials that include various types of suspended solids. Some exemplary arrangements are particularly useful in pumping sewage.

An exemplary arrangement includes a pump having a housing that is in operative connection with a motor. The motor is operative to selectively rotate a drive shaft. The housing includes a pump chamber including an inlet opening that enables the liquid to enter the pump chamber and an outlet opening that enables the liquid to leave the pump chamber. An impeller is rotatably movably mounted in the pump chamber and is in operative connection with the drive shaft.

A slicer plate extends in axially disposed outwardly overlying relation of the inlet opening. The exemplary slicer plate includes a generally planar slicer face that is in a facing direction away from the inlet opening. The slicer plate includes a plurality of slicer plate fluid openings. The exemplary slicer plate further includes an axially extending drive opening.

A slicer extends in outwardly overlying relation of the slicer plate. The exemplary slicer includes a hub that is in operative connection with the drive shaft through the drive opening of the slicer plate. The slicer includes a plurality of radially outward extending blade edges. The exemplary blade edges have cut points that extend in a common plane. Each of the blade edges is positioned in immediate adjacent relation with the slicer face.

A plurality of angularly disposed rotatable adjusting screws is in operative connection with the housing and the slicer plate. Rotation of the adjusting screws is operative to selectively axially and angularly position the slicer plate relative to the housing and the blade edges. Rotation of the adjusting screws enables the setting of a clearance distance between the slicer face and the blade edges without the need to disassemble the pump.

The exemplary slicer plate fluid openings and the slicer blade edges are configured so that no more than one slicer blade edge extends across a slicer plate fluid opening in any rotational position of the slicer. The exemplary blade edges extend arcuately so that the leading point of a blade edge is set back in a direction opposed of a direction of slicer rotation with increased radial distance outward from a central hub of the slicer. This reduces the energy required for slicer operation.

The cutting efficiency of the exemplary slicer is enhanced by the configuration of the faces of the blade edges and the slicer plate fluid openings. The exemplary blade edges in radially transverse cross-section extend at an acute angle relative to the slicer face and in close proximity thereto. The bounding walls of the slicer plate fluid openings that extend to the slicer face extend at an acute angle to the slicer face that the cut point of the blade axially outwardly passes after the opening. The contoured bounding wall slicer face and blade edge provide enhanced cutting of solid material which extends in the slicer plate fluid openings which facilitates pump operation.

Numerous additional features and benefits are provided in the exemplary arrangements as described in the Detailed Description herein.

DETAILED DESCRIPTION

Figure 2:
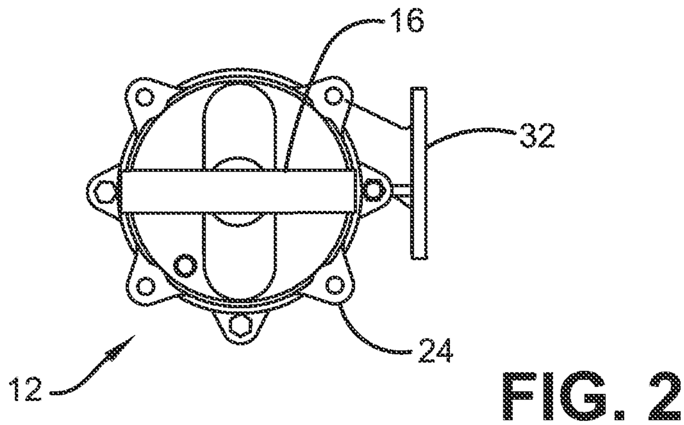
FIG. 2 is a top view of the pump shown in FIG. 1.
Figure 1:
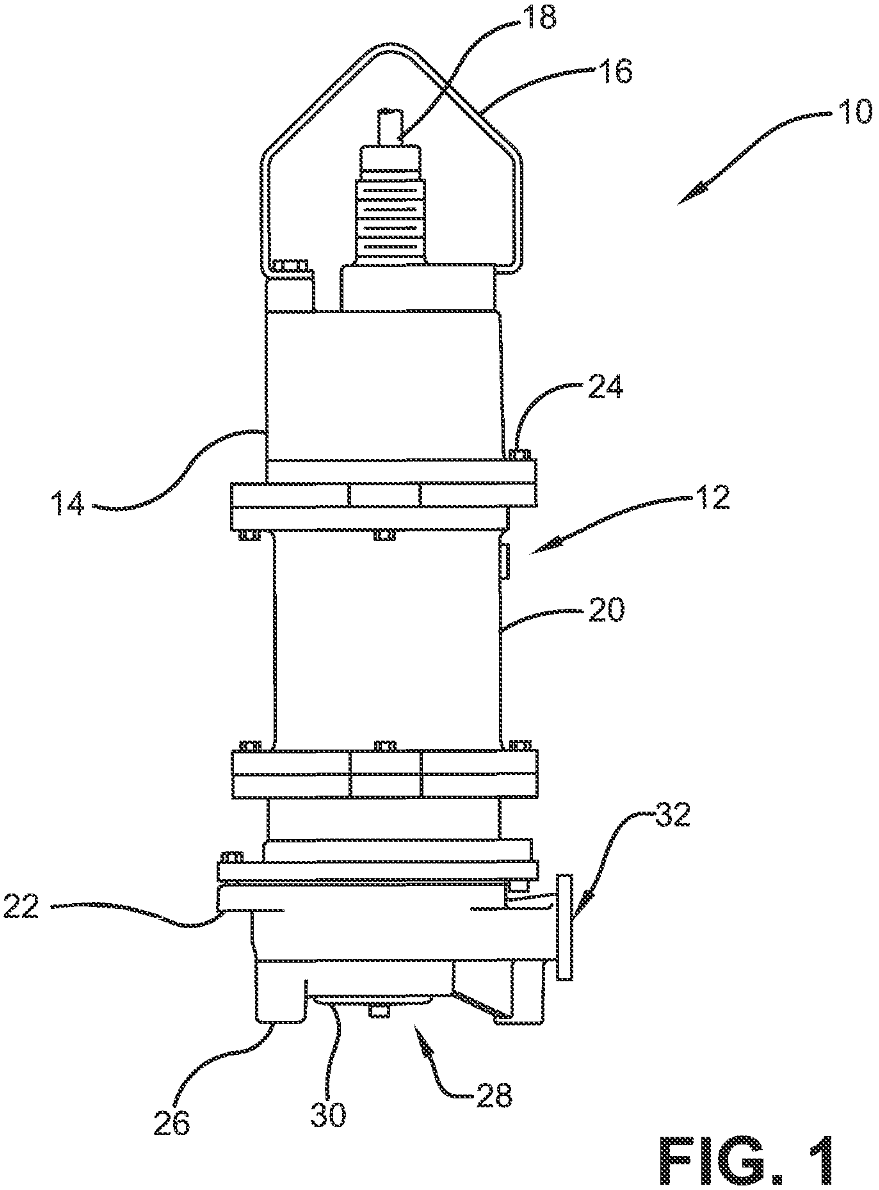
FIG. 1 is a front view of an exemplary pump apparatus including features of the exemplary arrangement.

Referring now to the drawings and particularly to FIG. 1 there is shown therein an exemplary pump apparatus generally indicated 10. The pump apparatus is alternatively referred to herein as a pump. The pump includes a housing 12. The exemplary housing 12 includes an upper housing 14 portion. The exemplary upper housing portion 14 has a handle 16 attached thereto. An electrical connector 18 which is configured to be connected to a source of electrical power extends from the upper housing portion 14.

The exemplary housing 12 further includes a mid housing portion 20 and a lower housing portion 22. The exemplary housing portions are held together by releasable fasteners 24. The lower portion of the housing 22 includes a plurality of disposed legs 26. The exemplary legs 26 are operative to support the pump on a bottom surface of a sump, tank or similar liquid holding structure. A pump inlet 28 which in the exemplary arrangement is comprised of a plurality of disposed openings as later discussed, is positioned intermediate of the legs 26. The rotating slicer 30 which is later described in detail, is positioned in underlying relation of the pump inlet. The lower housing 22 further includes a pump outlet 32. The exemplary pump outlet includes a flange or other suitable liquid connector. The exemplary pump is configured to be operated as a submersible pump. However it should be understood that this configuration is exemplary and in other arrangements other pump configurations may utilize the features described herein.

Figure 3:
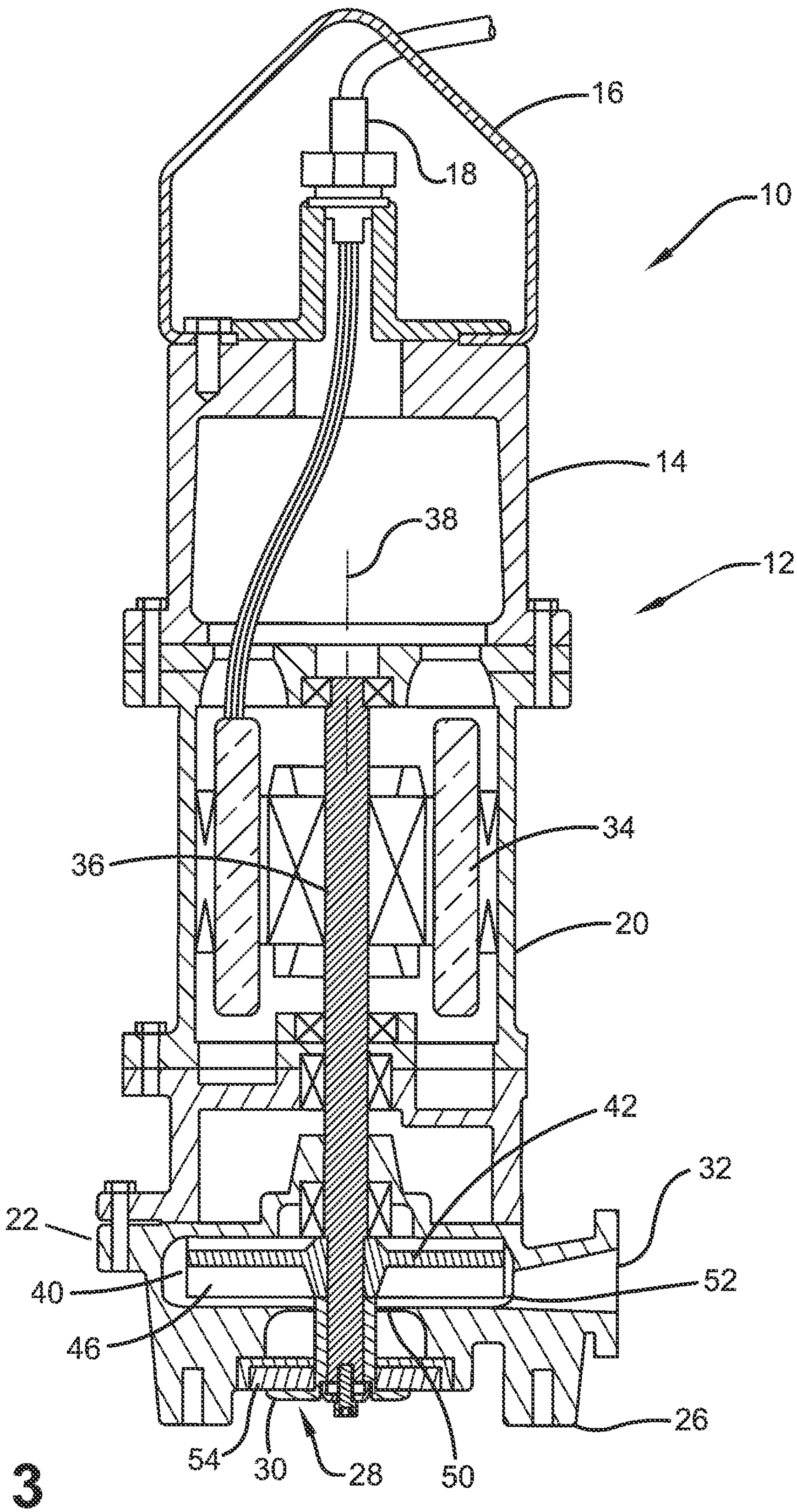
FIG. 3 is a cross-sectional view of the exemplary pump.
Figure 4:
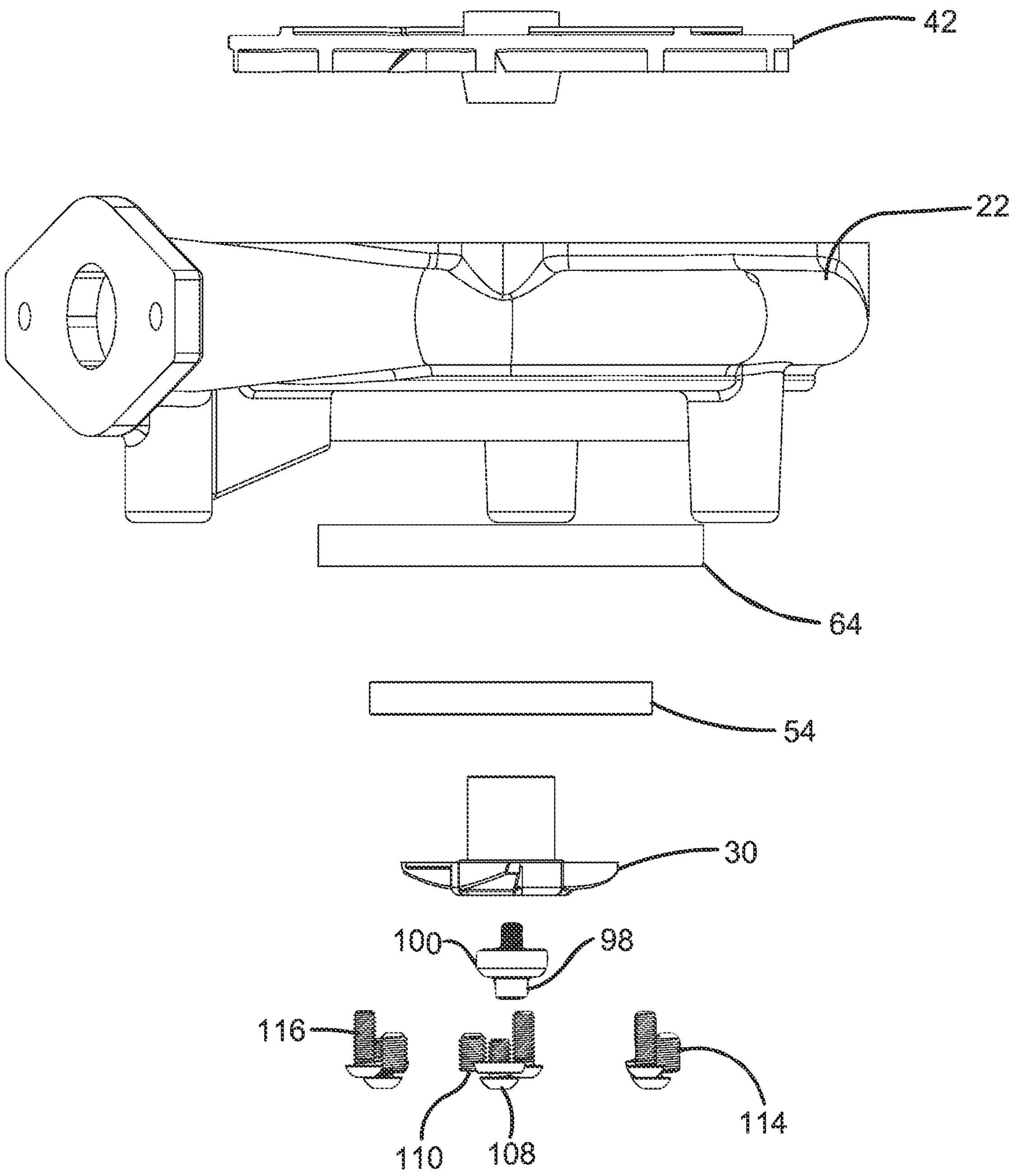
FIG. 4 is an exploded view of the lower housing of the exemplary pump and the slicer, slicer plate, mounting plate and impeller.
Figure 5:
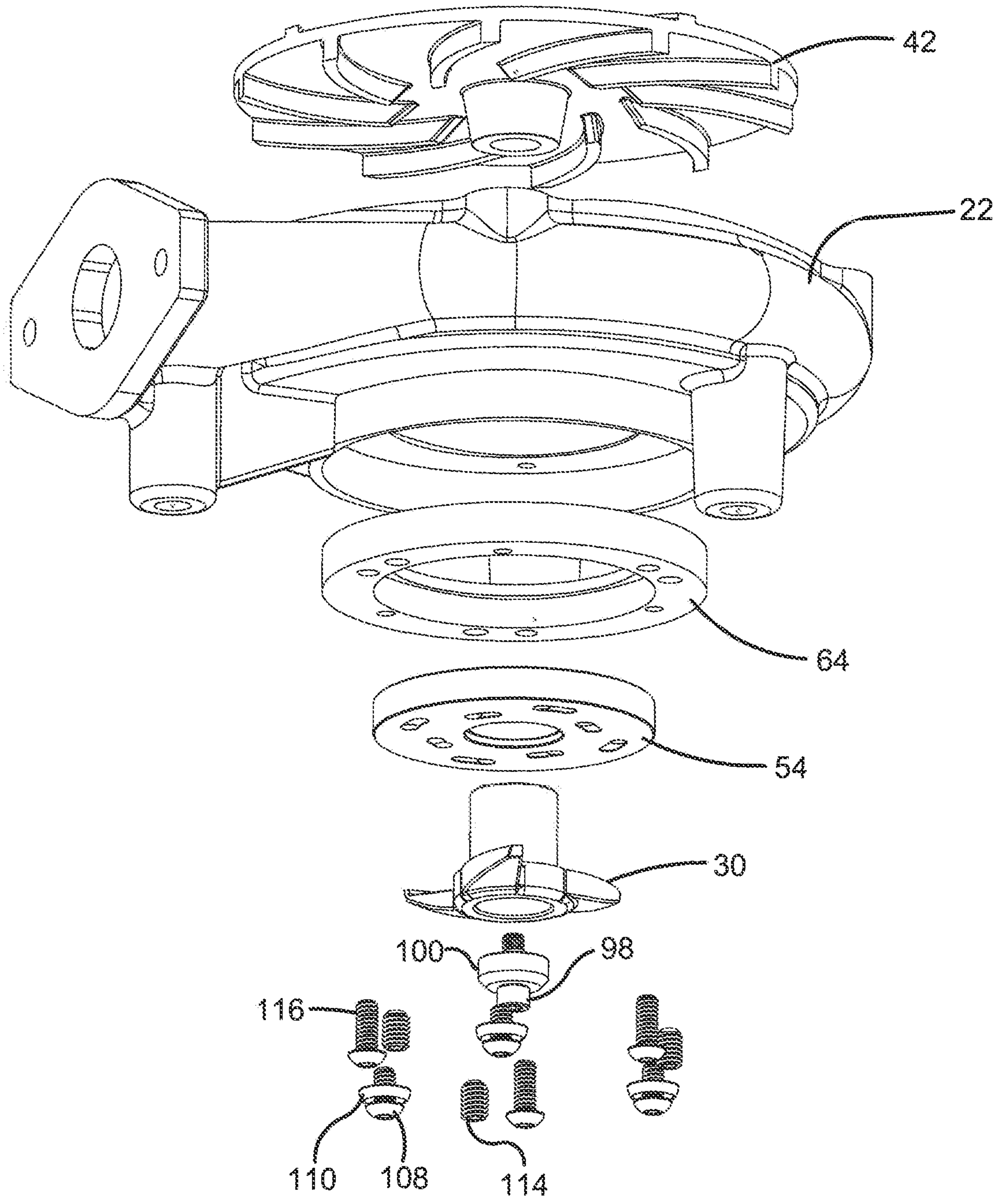
FIG. 5 is a perspective exploded view showing the lower housing, slicer, slicer plate, mounting plate and impeller.

As shown in cross-section in FIG. 3 the exemplary pump 10 includes a motor 34. The exemplary motor is located in the mid housing portion 20. The exemplary motor is an electric motor. However it should be understood that in other arrangements other types of motors may be used. The exemplary motor is in operative connection with a drive shaft 36. The drive shaft 36 extends along an axis 38. The exemplary drive shaft 36 extends vertically in the operative position of the pump.

Figure 9:
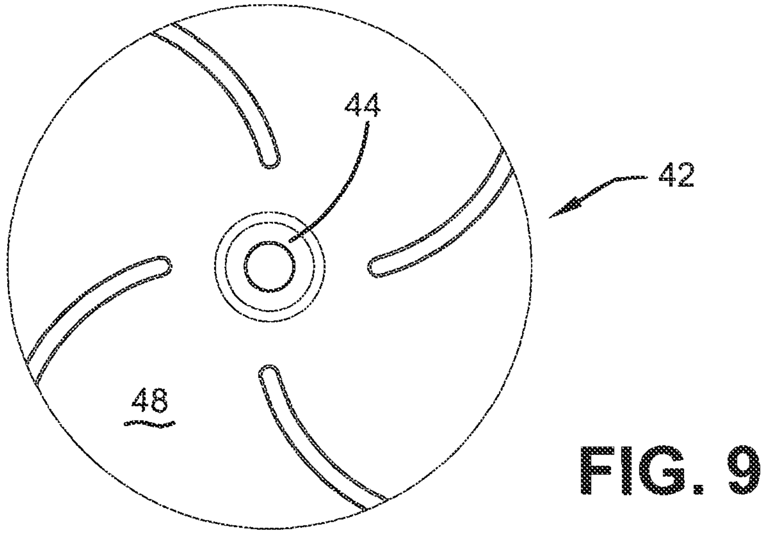
FIG. 9 is a top view of the impeller.
Figure 8:
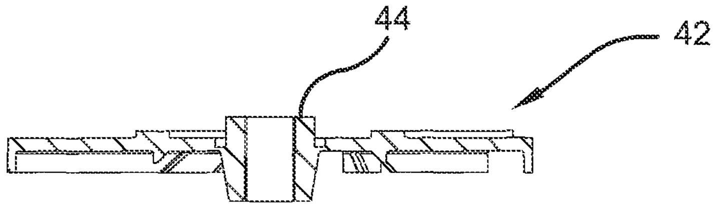
FIG. 8 is a cross-sectional view of the impeller taken along line 8-8 in FIG. 7.
Figure 7:
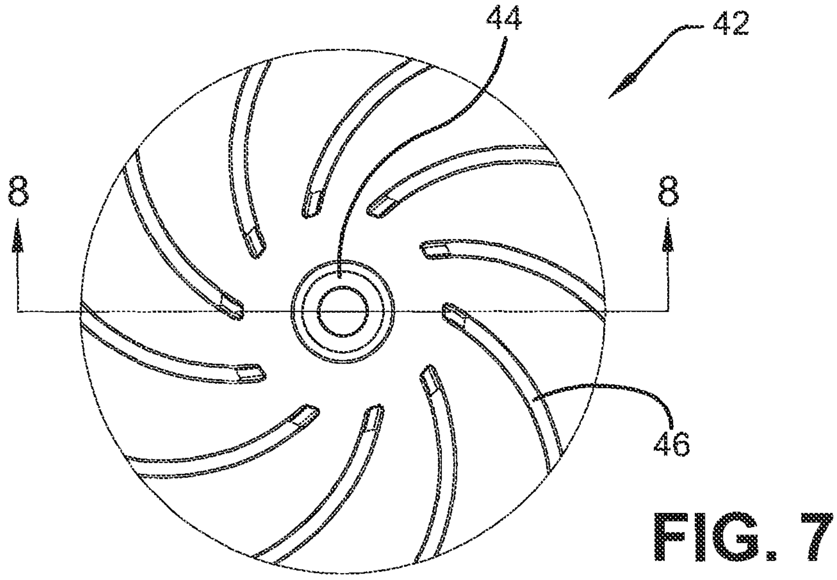
FIG. 7 is a bottom view of an exemplary impeller.
Figure 10:
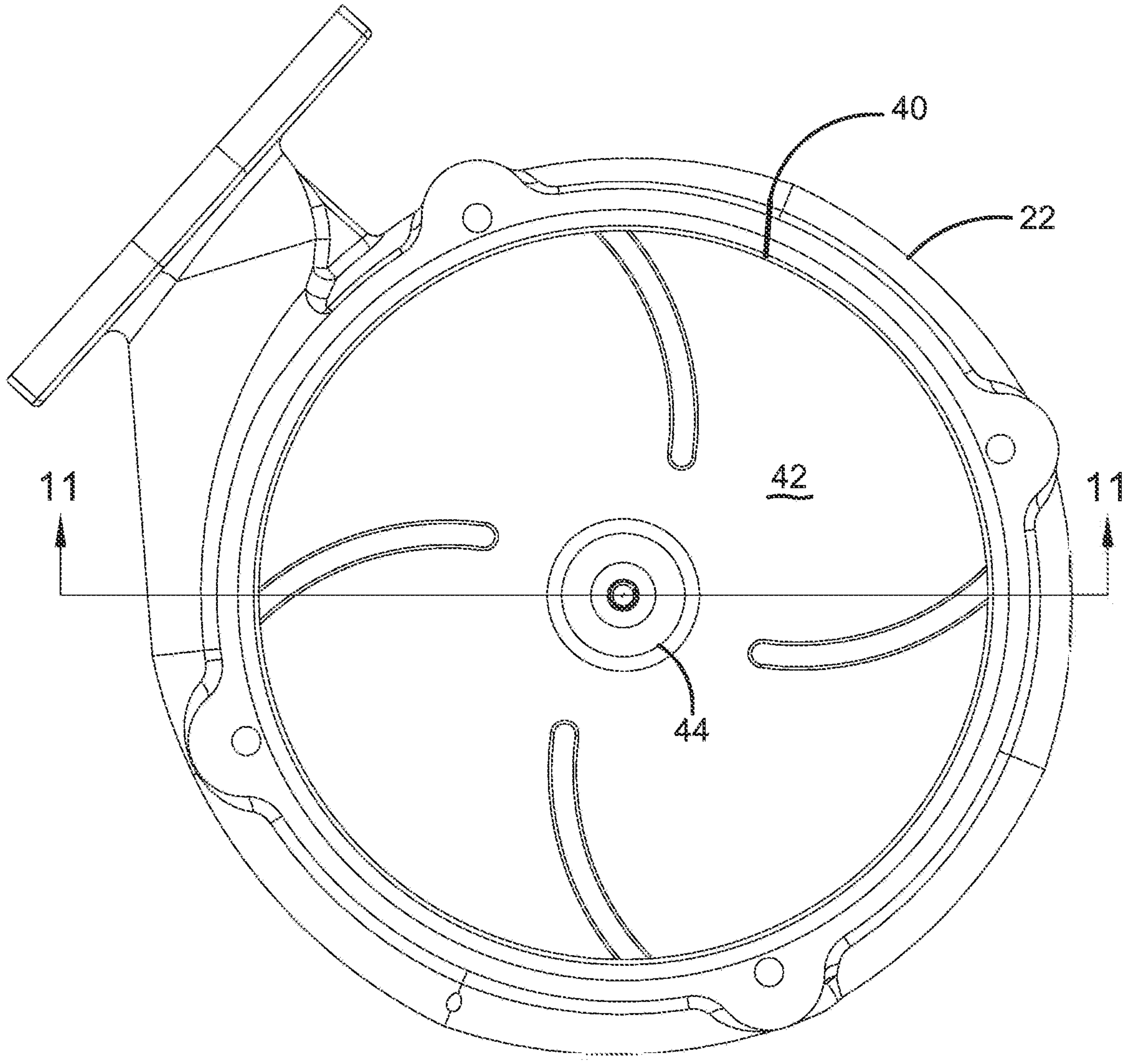
FIG. 10 is a top view of the impeller shown positioned in the pump chamber of the lower housing.
Figure 11:
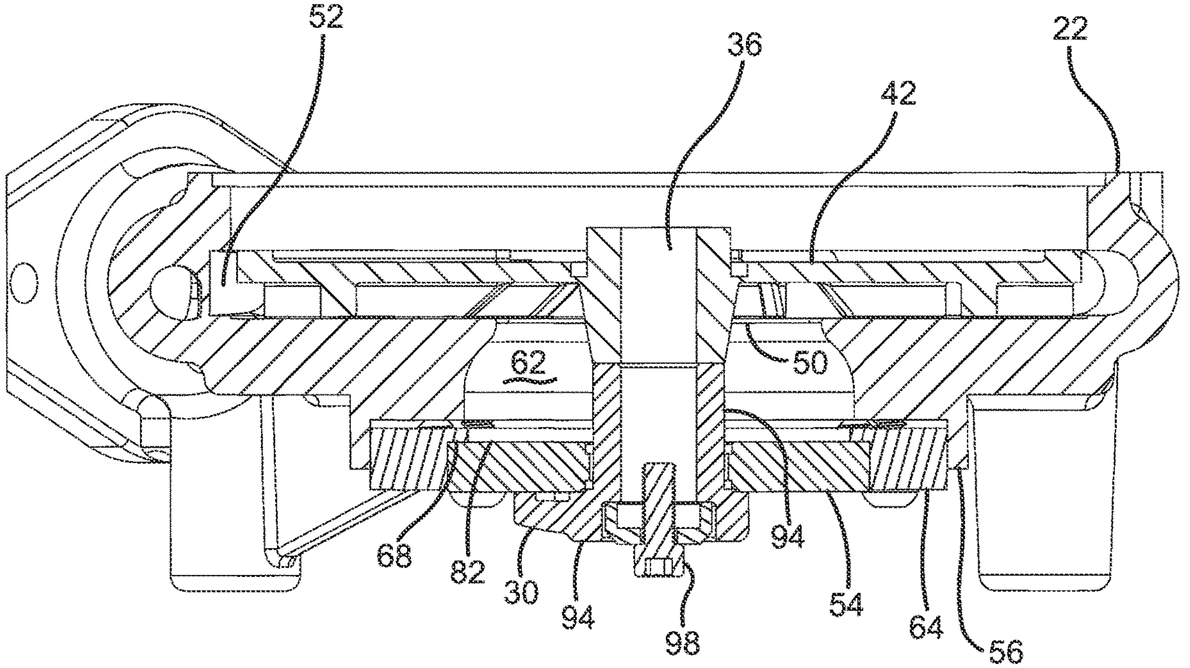
FIG. 11 is a cross-sectional view taken along line 11-11 in FIG. 10.
Figure 12:
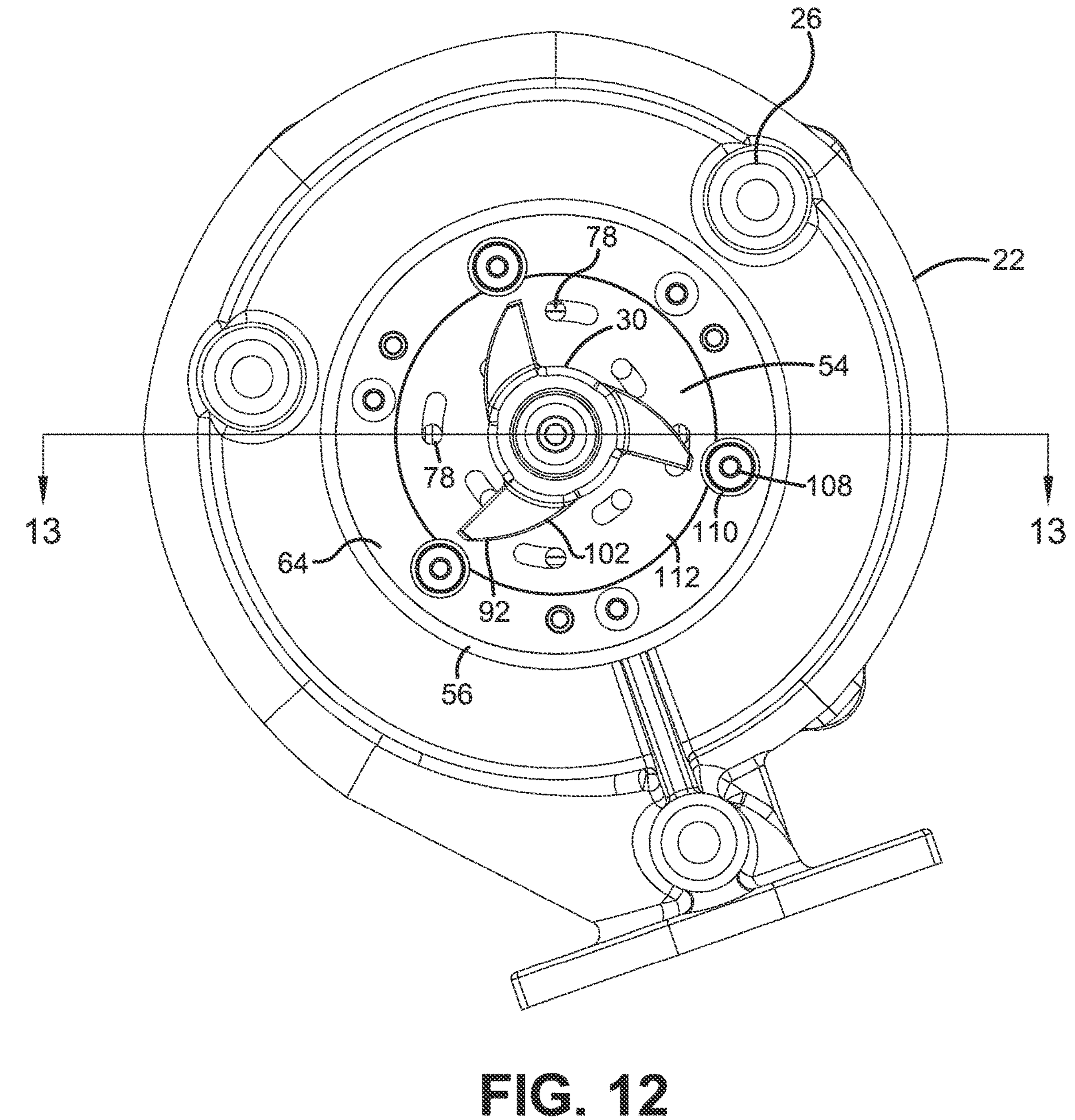
FIG. 12 is a bottom view of the pump lower housing with the mounting plate, slicer plate and slicer in the operative position.
Figure 13:
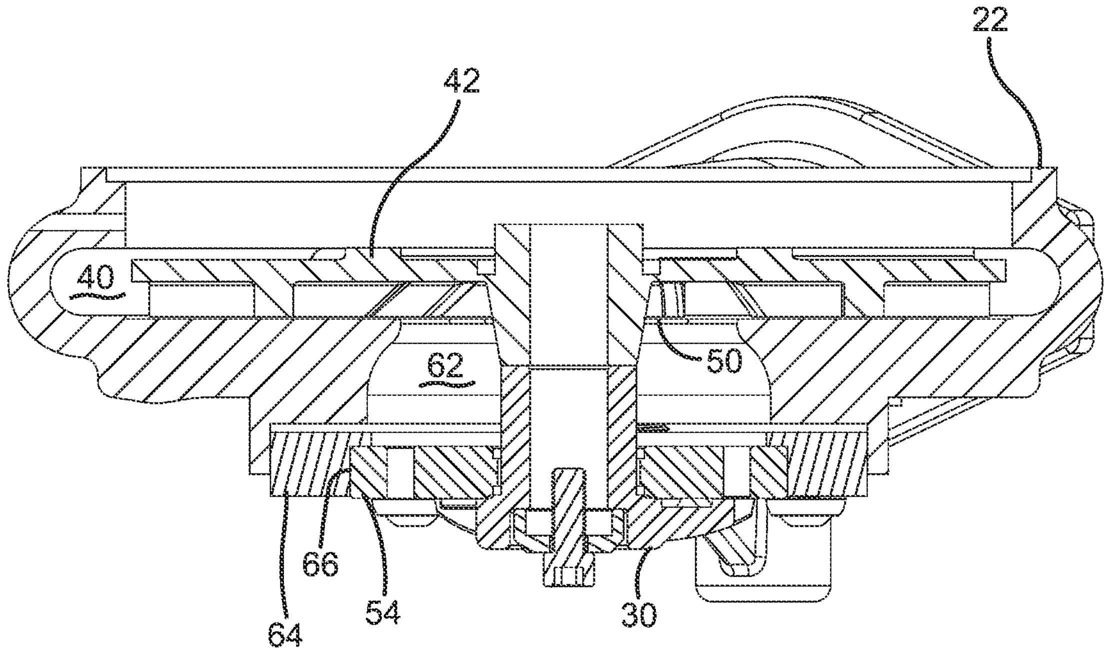
FIG. 13 is a cross-sectional view taken along line 13-13 in FIG. 12.
Figure 14:
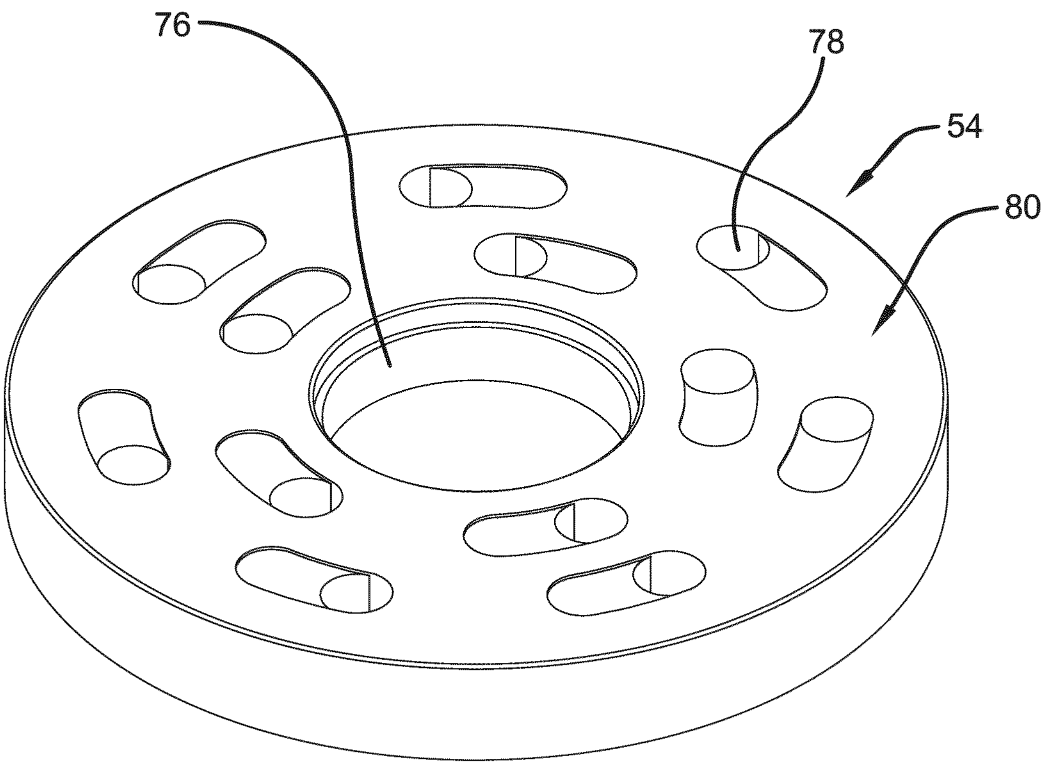
FIG. 14 is a perspective view of an exemplary slicer plate.
Figure 15:
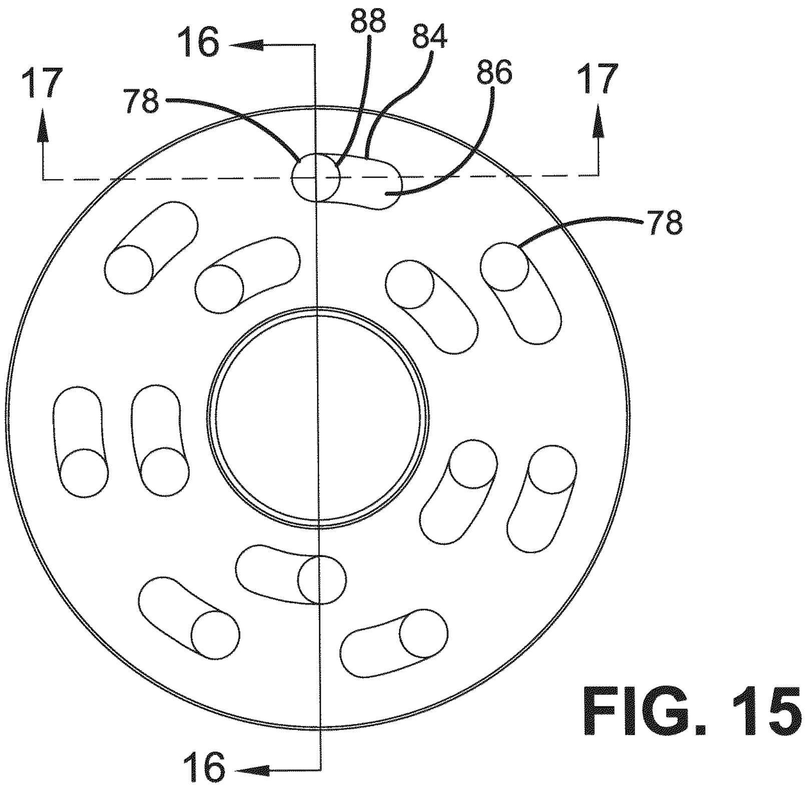
FIG. 15 is a bottom view of the exemplary slicer plate.
Figure 16:
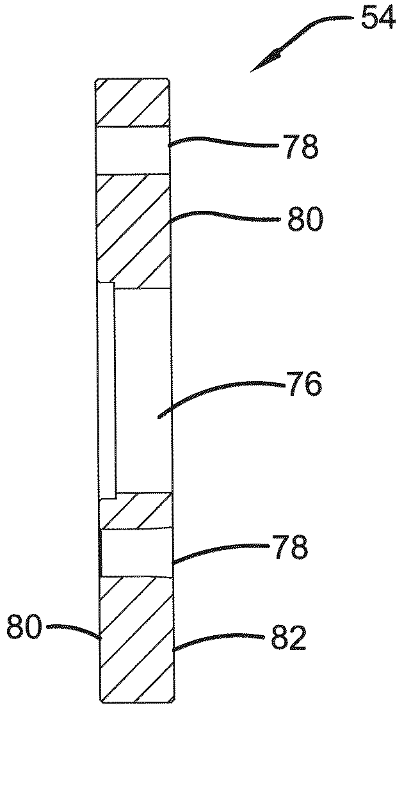
FIG. 16 is a cross-sectional view taken along line 16-16 in FIG. 15.

The exemplary drive shaft 36 extends in the lower housing portion 22. The lower housing portion includes a pump chamber 40. An impeller 42 is positioned in the pump chamber and is rotatable therein. The exemplary impeller 42 is a centrifugal impeller which is shown in greater detail in FIGS. 7-9. The exemplary impeller 42 includes a central impeller hub 44 that is engaged with the drive shaft 36. The impeller 42 further includes a plurality of curved radially outward extending impeller vanes 46 on a lower surface thereof. The impeller vanes extend downward from the underside of a base plate 48. Of course it should be understood that this impeller configuration is exemplary and in other arrangements other approaches and impeller configurations may be used.

The exemplary pump chamber 40 includes an axially aligned inlet opening 50. In the exemplary arrangement the drive shaft 36 extends in centered relation through the inlet opening. The inlet opening of the pump chamber is in fluid connection with the pump inlet 28. The pump chamber further includes an outlet opening 52. The outlet opening 52 of the pump chamber extends radially away from the axis and is in fluid communication with the pump outlet 32. In the exemplary arrangement the lower end of the drive shaft 36 extends through a drive opening in a slicer plate 54 which is later described in detail. The lower end of the drive shaft 36 is connected to the slicer 30. In the exemplary arrangement the slicer 30 is in fixed connection with the drive shaft 36 and the impeller 42 and is rotatable therewith. Of course it should be understood that this arrangement is exemplary and in other arrangements other approaches may be used.

Figure 6:
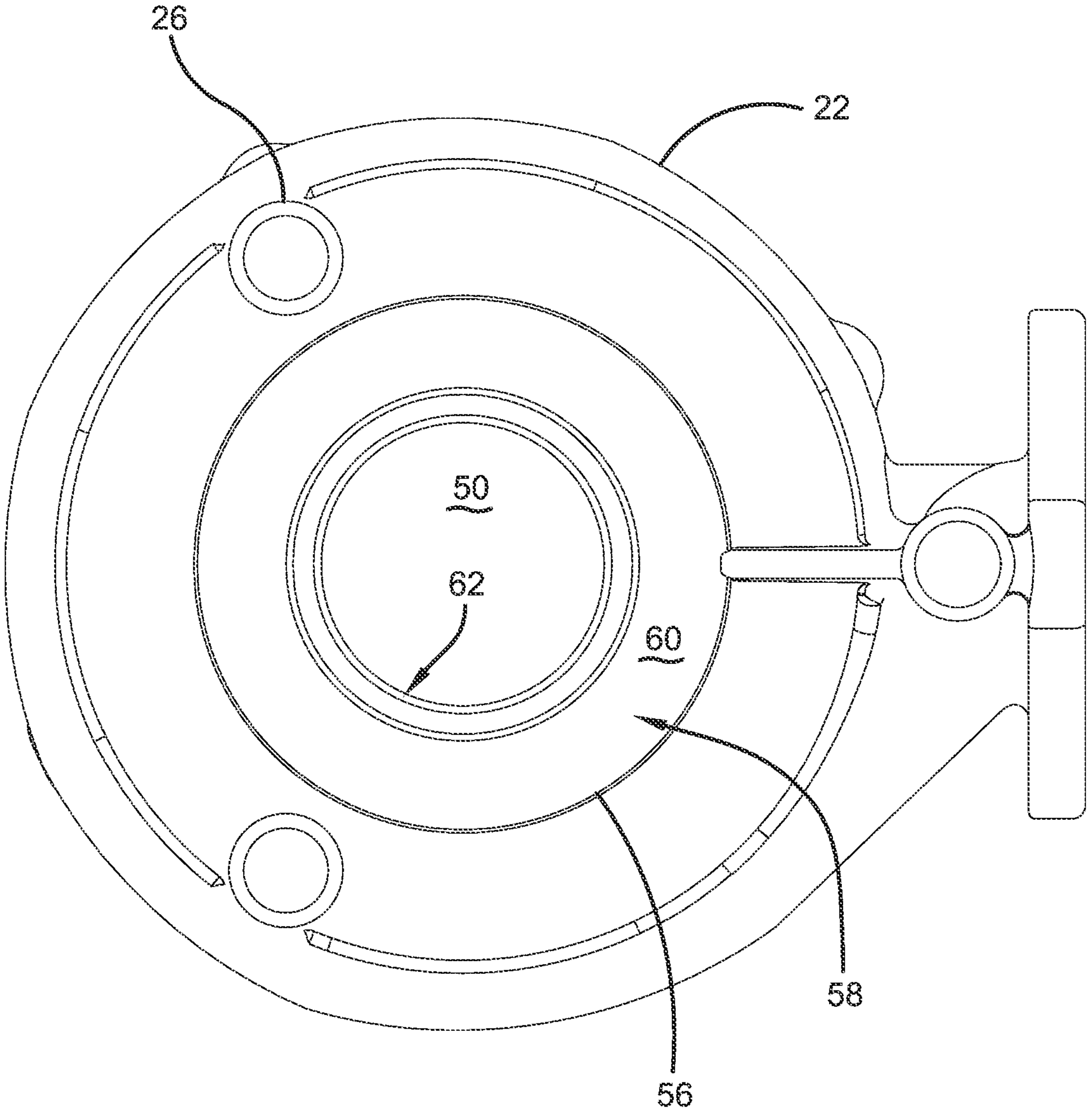
FIG. 6 is a bottom view of the exemplary lower housing.

As shown in the bottom view of the housing in FIG. 6, the exemplary lower housing 22 includes an axially centered circular wall 56. The wall 56 annularly bounds a mounting plate recess 58. The mounting plate recess in the exemplary arrangement is bounded upwardly in the operative position of the pump, by a generally continuous axially centered radially extending annular land surface 60. The exemplary land surface extends radially outward from the fluid passage 62 and the lower housing 22 extends axially from the land surface to the inlet opening 50 of the pump chamber 40. It should be noted that while in the exemplary arrangement the land surface 60 is a continuous radially extending annular surface, in other exemplary arrangements the land surface may comprise separate arcuate segments or radially extending surface portions. As used herein the term generally continuous when referring to an annular surface will include a continuous annular surface as well as an arcuate arrangement comprised of discrete segments or portions.

In the exemplary arrangement a mounting plate 64 is configured to be releasably and movably positioned in the mounting plate recess 58. The exemplary mounting plate is shown in greater detail in FIGS. 18-21. The exemplary mounting plate 38 includes an axially centered slicer plate recess 66. The slicer plate recess 66 is bounded upwardly in the operative position of the pump, by an annular generally continuous radially inward extending annular ledge 68. In the exemplary arrangement the slicer plate recess 66 is configured to releasably receive the slicer plate 54 therein.

The exemplary mounting plate 64 further includes a plurality of angularly spaced openings. In the exemplary arrangement the mounting plate 64 includes three angularly spaced unthreaded fastener accepting through openings 70. The fastener openings are configured to receive threaded fasteners such as bolts that may be utilized to hold the mounting plate in fixed engagement with the lower housing in a manner like that later discussed. The mounting plate 64 further includes a plurality of angularly spaced threaded adjusting screw openings 72. The adjusting screw openings are internally threaded in the exemplary arrangement, and are configured to receive adjusting screws therein which are utilized for selectively axially and angularly positioning the mounting plate and the slicer plate relative to the housing and the slicer. The mounting plate further includes angularly spaced slicer plate holding fastener openings 74. In the exemplary arrangement the slicer plate holding fastener openings 74 are threaded openings which are configured to releasably engage fasteners that hold the slicer plate 24 in the operative position in fixed engagement with the mounting plate. In the exemplary arrangement of the mounting plate the adjusting screw openings and the slicer plate holding fastener openings are mounted in uniformly angularly spaced relation and a respective adjusting screw opening and a respective slicer plate holding fastener opening are diametrically opposed. The fastener through openings 70 are also uniformly angularly spaced and configured to be in alignment with threaded openings that extend inwardly from the land surface 60 of the housing. Of course this arrangement is exemplary and in other arrangements other mounting plate configurations may be used.

The exemplary slicer plate 54 is shown in greater detail in FIGS. 14-17. The exemplary slicer plate is circular and is configured to extend in close-fitting relation in the slicer plate recess 66. A slicer drive opening 76 is axially centered in the slicer plate 54. In the operative position of the slicer plate, the slicer plate is in axially outwardly overlying relation of the inlet opening of the pump chamber. As used herein the terminology outwardly overlying relation includes arrangements in which the overlying structure that is being referred to, extends underneath another structure that it is referred to as overlying. The exemplary slicer plate further includes a plurality of slicer plate fluid openings 78. The slicer plate fluid openings are disposed radially outward from the slicer drive opening 76 and extend through the slicer plate. The passages through the slicer plate provide fluid openings that comprise the pump inlet 28 through which liquids and solid materials that are sliced through operation of the slicer 30, enter the interior of the pump. The exemplary slicer plate fluid openings are angularly and radially spaced so that only one blade edge of the slicer extends across one of the slicer plate fluid openings in any rotational position of the slicer as later discussed.

The exemplary slicer plate 54 includes a generally planar slicer face 80. When used herein generally planar means that a majority of the area of the face surface extends in a single common plane. In the operative position of the slicer plate 54 the slicer face 80 faces downward. The exemplary slicer plate 54 further includes an inner slicer plate surface 82. The inner slicer plate surface 82 is generally parallel to the face surface 80 in the exemplary arrangement. The outer peripheral area of the inner slicer plate surface 82 is configured to engage the annular ledge 68 of the mounting plate 64 in the operative position of the slicer plate. However it should be understood that this approach is exemplary and in other arrangements other approaches and configurations may be used.

In the exemplary arrangement each of the slicer plate fluid openings 78 is configured to facilitate the slicing action of solid material by the slicer. In some exemplary arrangements a generally circular wall bounds a respective opening 78 in the slicer plate, and extends from within the slicer plate to the slicer face 80 in a direction that is perpendicular to the slicer face. In such exemplary arrangements the portions of the wall bounding a respective fluid passage within the slicer plate, viewed in a cross-section transverse to a radial direction from the axis and to the center of the fluid opening (which section corresponds to the direction of travel of the blade arms of the slicer 30 in overlying relation of the opening), both extend perpendicular to the slicer face and extend from within the slicer plate to the slicer face 80. In such arrangements the fluid openings may be sized to enable solid material of the type that is commonly encountered by the pump to be moved with the flow of liquid partially into a respective fluid opening prior to passage of a blade arm of the slicer across and in overlying relation of the opening at the slicer face, which passing blade arm slices the solid material into smaller pieces. In exemplary arrangements the solid material is sliced as a result of being positioned between a slicing edge on the blade arm of the slicer and the wall portion bounding the fluid opening at the slicer face on a side that faces the direction of the rotation of the slicer.

In other exemplary arrangements each fluid passage within the slicer plate may include in radially transverse cross-section, bounding wall portions that at the slicer face, extend at an angle other than perpendicular to the slicer face to facilitate the slicing action of the slicer. For example, in some exemplary arrangements the bounding wall portion which extends to the slicer face, and which at the slicer face, faces toward the direction of rotation of the slicer, may extend at an acute angle relative to the slicer face. Such an exemplary arrangement may provide an acutely angled cutting edge on the portion of the slicer face (80) that bounds the respective fluid opening on the side of the fluid opening that faces the direction of rotation of the slicer. Such a cutting edge on the slicer face at the opening may facilitate slicing solid material as the slicing edges of the blades of the slicer move in outwardly overlying relation across the fluid opening.

In still other exemplary arrangements the openings 78 may include other features. For example each of the openings may have an associated trough 84. In some arrangements the use of such troughs may facilitate the flow of solid materials into the fluid openings in the slicer plate and enhance the slicing action provided by the slicer. Each trough in the exemplary arrangement may extend in the slicer face from a first trough end 86 to a first opening bounding wall portion 88 which bounds the respective slicer plate opening in radially transverse cross-section. In the exemplary arrangement each trough extends from the first opening bounding wall in a direction opposed of the rotational direction of the slicer 30. Each exemplary trough is arcuately curved with radially spaced side walls bounding the trough that correspond to an arc at a radial distance from the axis corresponding to the respective side wall. Each trough further has a radial width between the side walls that corresponds to the radial width of the slicer plate fluid opening 78 at the slicer plate 80.

Figure 17:
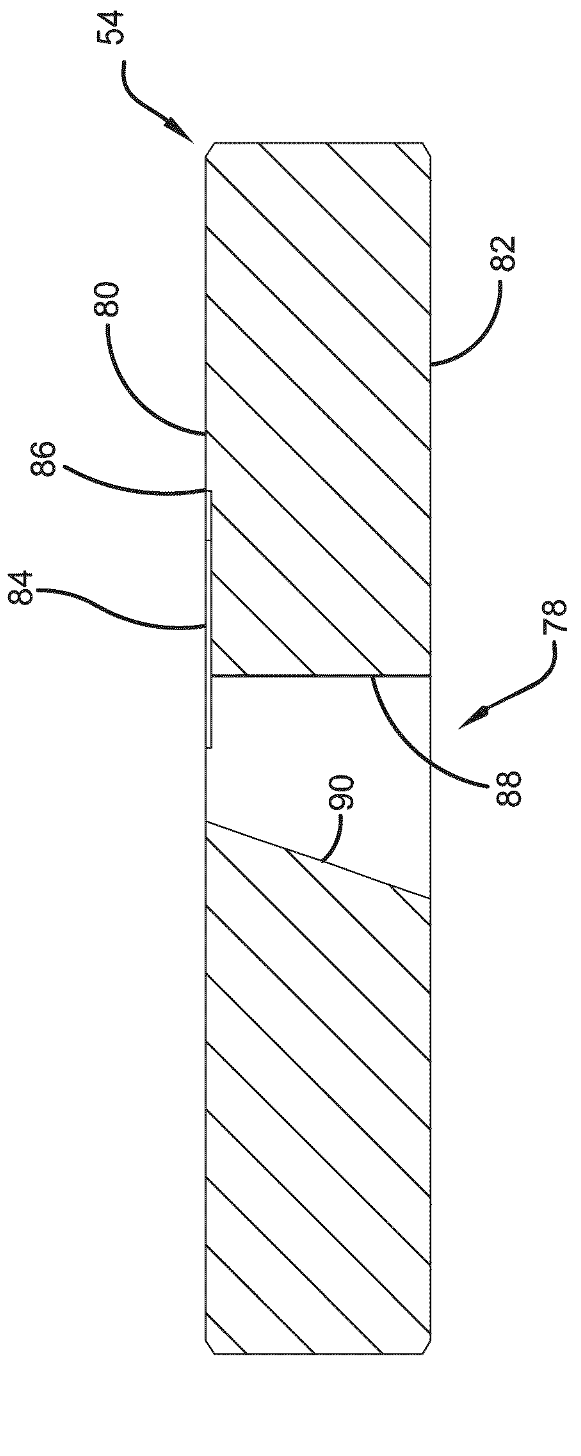
FIG. 17 is an enlarged radially transverse cross-section of a slicer plate fluid opening taken along line 17-17 in FIG. 15.
Figure 21:
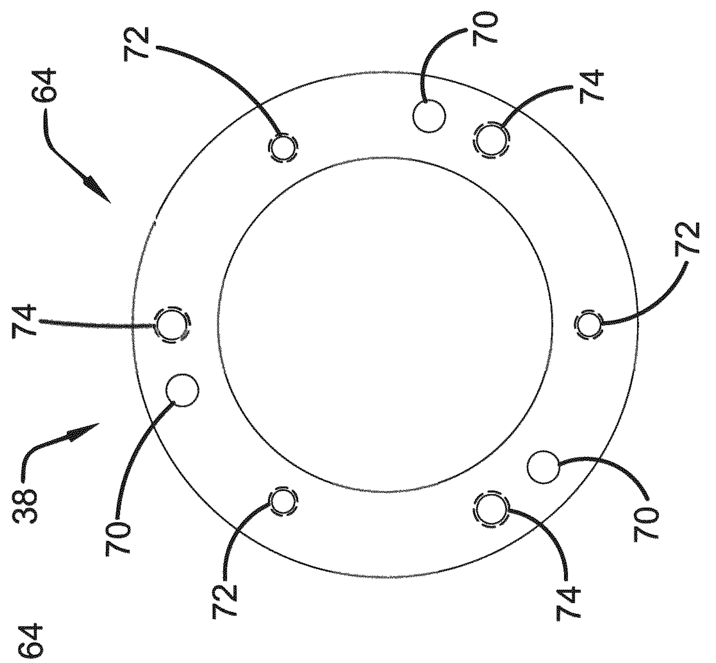
FIG. 21 is a top view of the exemplary mounting plate.
Figure 20:
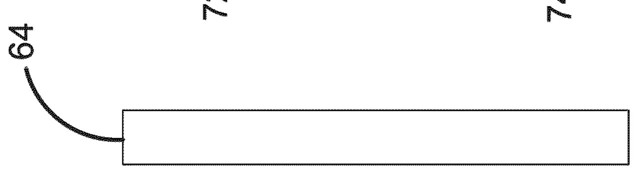
FIG. 20 is a side view of the exemplary mounting plate.
Figure 19:
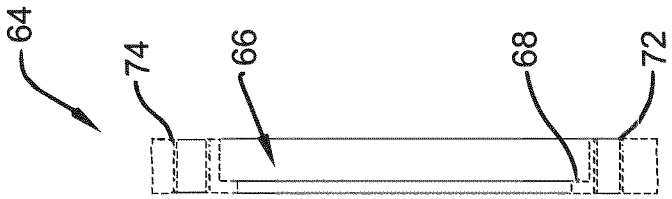
FIG. 19 is a diametric cross-sectional view of the exemplary mounting plate.
Figure 18:
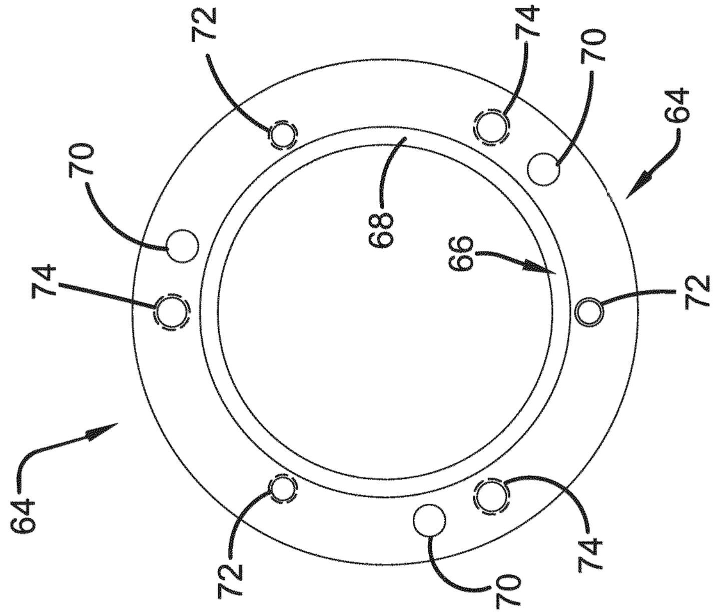
FIG. 18 is a bottom view of an exemplary mounting plate.
Figure 25:
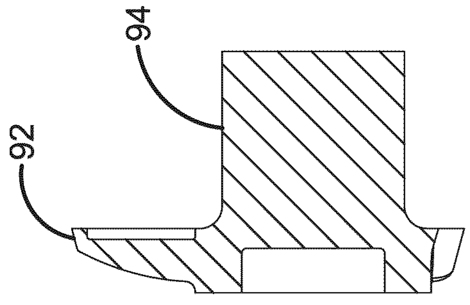
FIG. 25 is a cross-sectional view taken along line 25-25 in FIG. 22.
Figure 24:
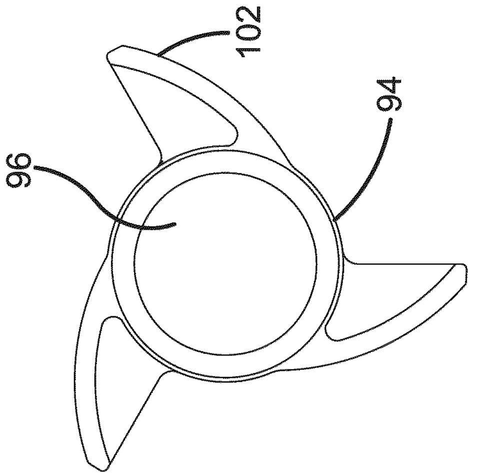
FIG. 24 is a top view of the exemplary slicer.
Figure 26:
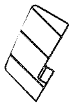
FIG. 26 is a cross-sectional view taken along line 26-26 in FIG. 22.
Figure 22:
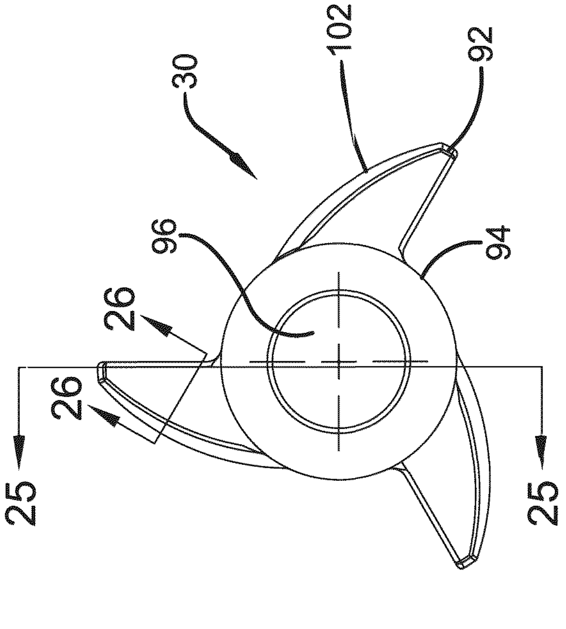
FIG. 22 is a bottom view of an exemplary slicer.
Figure 23:
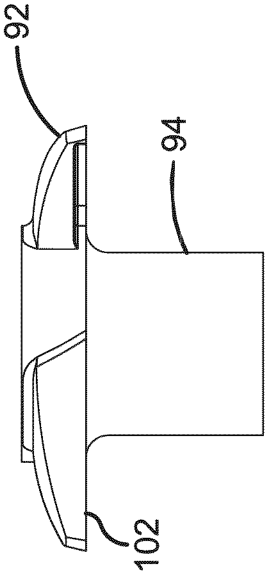
FIG. 23 is a side view of the exemplary slicer.

In the exemplary arrangement including the exemplary troughs as best shown in FIG. 17, each of the slicer plate fluid openings is configured such that the second opening bounding wall portion 90 of each slicer plate fluid opening 78, in radially transverse cross-section, extends to the slicer face 80. The bounding wall portion 90 (which faces the direction of slicer rotation) extends at an acute angle relative to the slicer face 80 on an opposed side of the fluid opening from the respective trough 84. Further in an exemplary arrangement the second opening bounding wall portion 90 in radially transverse cross-section at the slicer face, extends at an obtuse angle relative to the first opening bounding wall portion 88. This configuration may help to facilitate the slicing of certain types of solid material that are suspended in the liquid and which extend partially into the slicer plate fluid openings. However this configuration is exemplary and in other arrangements other approaches may be used.

The exemplary slicer 30 is shown in greater detail in FIGS. 22-26. The exemplary slicer 30 includes three equidistant radially outward extending blade arms 92. Each of the blade arms extends outwardly from a central hub 94. The central hub is configured to extend in the drive opening 76 of the slicer plate 54. The exemplary slicer 30 further includes a central opening 96 that is configured to receive the lower end of the drive shaft 36 therein. A fastener 98 and a retainer 100 extend in the central opening 96 of the slicer to hold the slicer in releasable fixed engagement so as to be rotatable with the drive shaft. Of course this approach is exemplary and in other arrangements other approaches may be used.

Each of the blade arms 92 of the slicer 30 include a respective blade edge 102. Each blade edge is configured to provide a cutting surface that slices solid material that partially extends in a slicer plate fluid opening 78 as the blade edge moves across the respective opening. In the exemplary arrangement each blade edge extends arcuately radially outward from the hub. This exemplary configuration provides that the leading cut point of the blade edge is further setback in a direction opposed of the direction of slicer rotation, with increased radial distance outward from the hub. This arrangement of the exemplary slicer 30 and slicer plate 54 provide that no more than one slicer blade edge extends across a slicer plate fluid opening in any rotational position of the slicer. This exemplary arrangement provides that only one blade edge operates to slice solid material at any given time during rotation of the slicer. This helps to reduce the power required for rotation of the slicer in the exemplary arrangement. Of course it should be understood that this configuration is exemplary and in other arrangements other approaches may be used.

Figure 34:
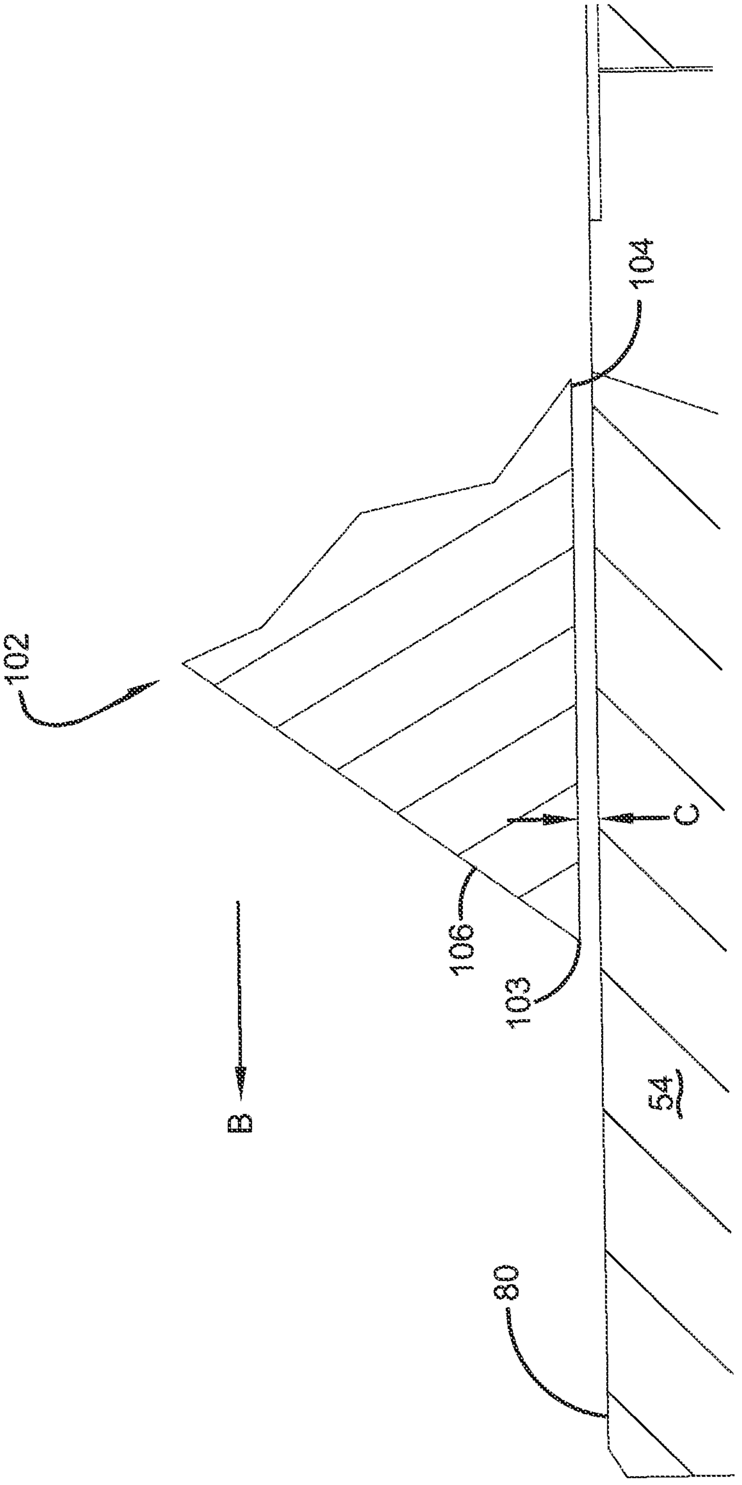
FIG. 34 is an enlarged view of the exemplary blade edge and slicer face of FIG. 33 showing the blade edge disposed a clearance distance that is adjustable between the blade edge and the slicer face.

As shown in FIGS. 31-34 the exemplary blade edge 102 in radially transverse cross-section includes a cut point 103. In the exemplary arrangement all cut points extend in a common plane. The cut point 103 faces in the direction of movement of the blade edge which is represented by Arrow B. A first blade face 104 extends from the cut point. The first blade face 104 extends generally parallel to the slicer face 80 of the slicer plate 54. As used herein generally parallel refers to parallel +/−20°. A second blade face 106 extends from the cut point and away from the first blade face at an acute angle. As represented in FIG. 34 which shows an enlarged view of the exemplary blade edge 102, the first blade face 104 is disposed away from the slicer face 80 in a clearance direction perpendicular to the slicer face, a clearance distance indicated C. In exemplary arrangements this clearance distance is maintained within a desired range of only a few thousandths of an inch through the adjustable mounting arrangement of the slicer plate. Further the exemplary arrangement provides for adjustment of the clearance distance without having to disassemble components of the pump.

As shown in FIGS. 11-13 and 27-30, the slicer 30 in the operative position extends axially outward below the slicer plate 54. The blade edges 102 of the slicer pass over the slicer plate fluid openings 78 and slice solid material which extends partially in the openings. The troughs associated with the fluid openings in some exemplary arrangements may facilitate the flow of solids into the openings prior to the arrival of the blade edge. As shown in cross-section such as in FIGS. 11 and 13, the slicer plate 54 is positioned within the slicer plate recess 66 of the mounting plate 64. The periphery of the inner slicer plate surface 82 is in abutting engagement with the radially inward extending annular ledge 68 of the mounting plate 64.

Figure 29:
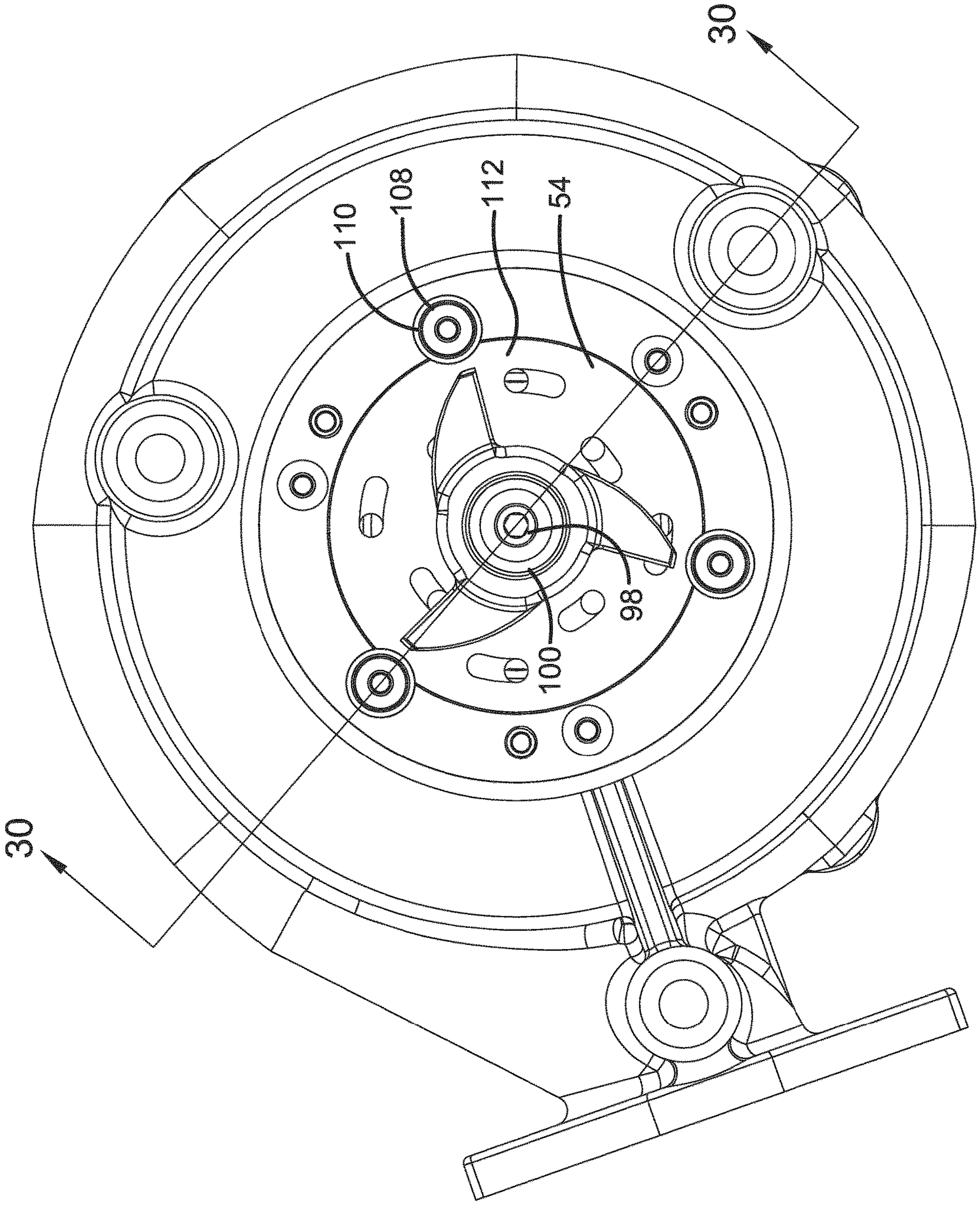
FIG. 29 is a further bottom view of the exemplary pump.
Figure 30:
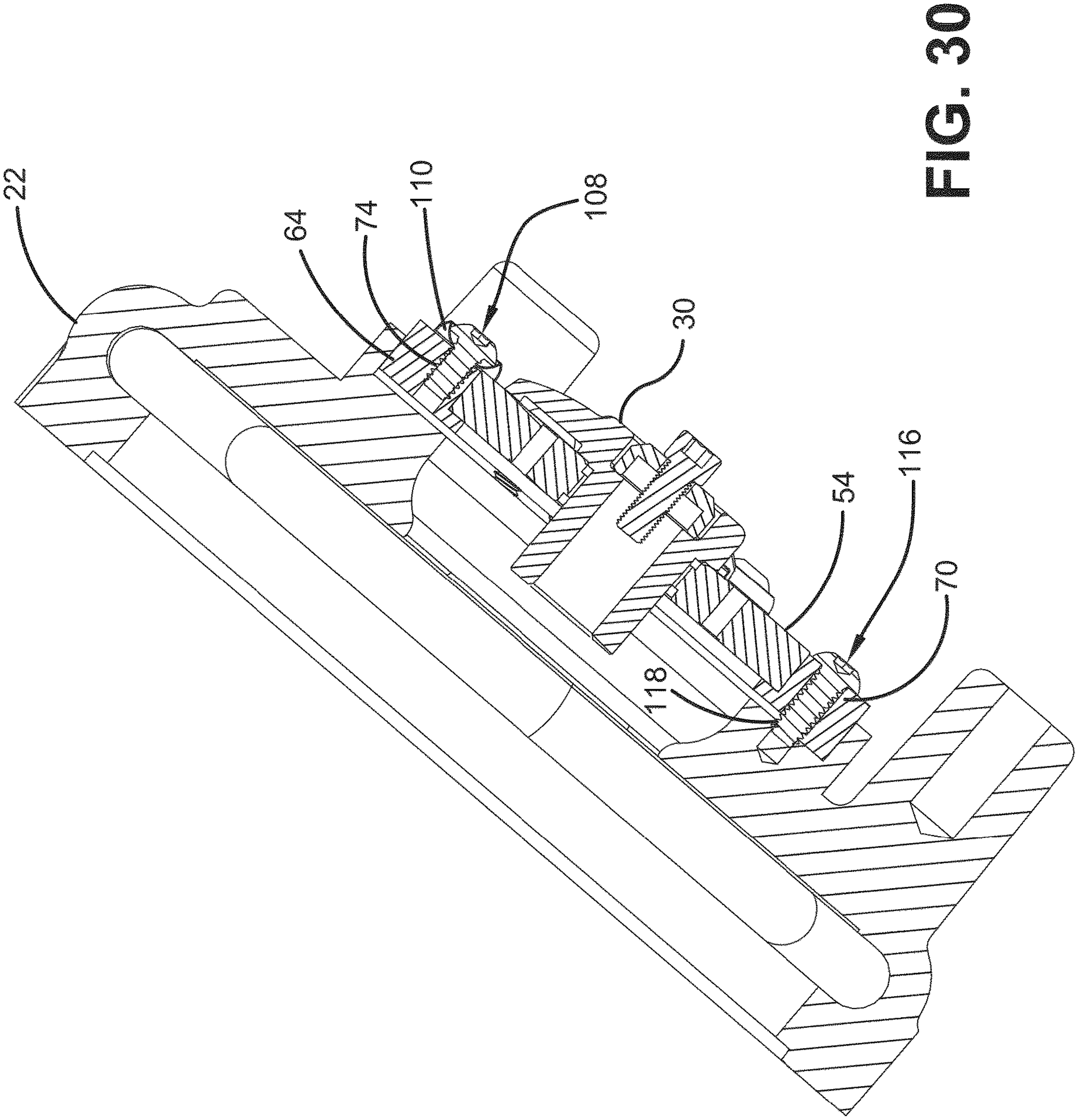
FIG. 30 is a cross-sectional view taken along line 30-30 in FIG. 29.
Figure 31:
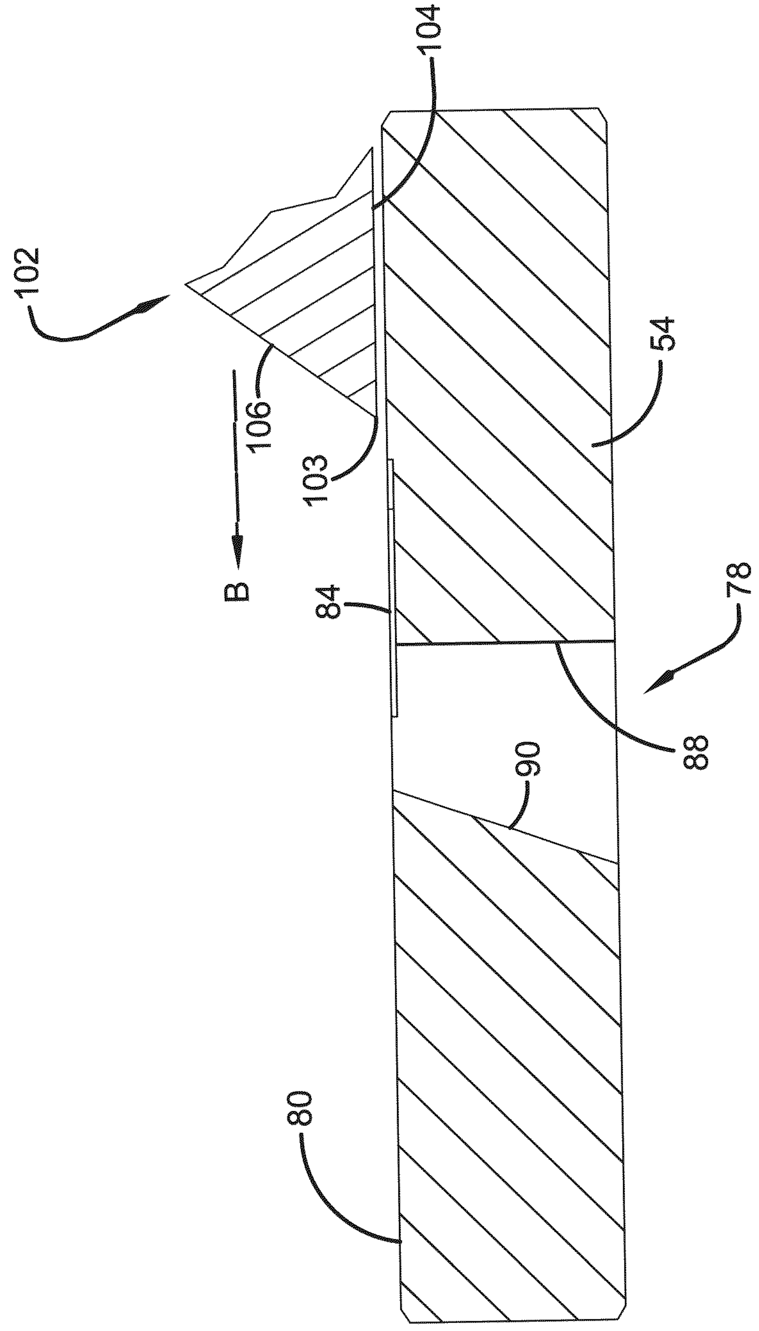
FIG. 31 is an enlarged partial radially transverse cross-sectional view of a slicer plate opening and a blade edge moving toward a slicer plate fluid opening.

As shown in FIGS. 29 and 30 the slicer plate 54 is releasably held in the slicer plate recess 66 by three releasable fasteners 108. The releasable fasteners 108 are in operative connection with respective overlying portions 110. The overlying portions 110 in the exemplary arrangement include washers or other structures which expand the effective radius of the releasable fasteners 108. Alternatively in other arrangements clips or other structures may be used as overlying portions. As shown in FIG. 30 fasteners 108 are in threaded engagement with the slicer plate holding fastener openings 74 of the mounting plate 64. In the holding position of the fasteners 108 the overlying portions 100 extend in overlying relation of the radially outward peripheral portion 112 of the slicer plate 54. Thus in the holding position of the fasteners, the slicer plate is held in the slicer plate recess 66 and in fixed engagement with the mounting plate.

The exemplary arrangement provides for the slicer plate 54 to be readily replaced. This may be necessary due to wearing of the slicer plate over time as a result of abrasion at the slicer plate fluid openings and the force applied to the slicer plate by the slicing action. In the exemplary arrangement the slicer plate may be changed by releasing the fastener 98 and retainer 100 which hold the slicer 30 in rotational connection with the drive shaft 36. The slicer may then be removed from the drive opening in the slicer plate. Removing the fasteners 108 and the overlying portions enables removal of the slicer plate from the slicer plate recess. A new slicer plate may then be installed and fixed in position by reinstalling the fasteners 108 such that the overlying portions 110 hold the peripheral portion of the slicer plate fixed in the recess. The slicer 30 may then be reinstalled to return the pump to operation.

Figure 27:
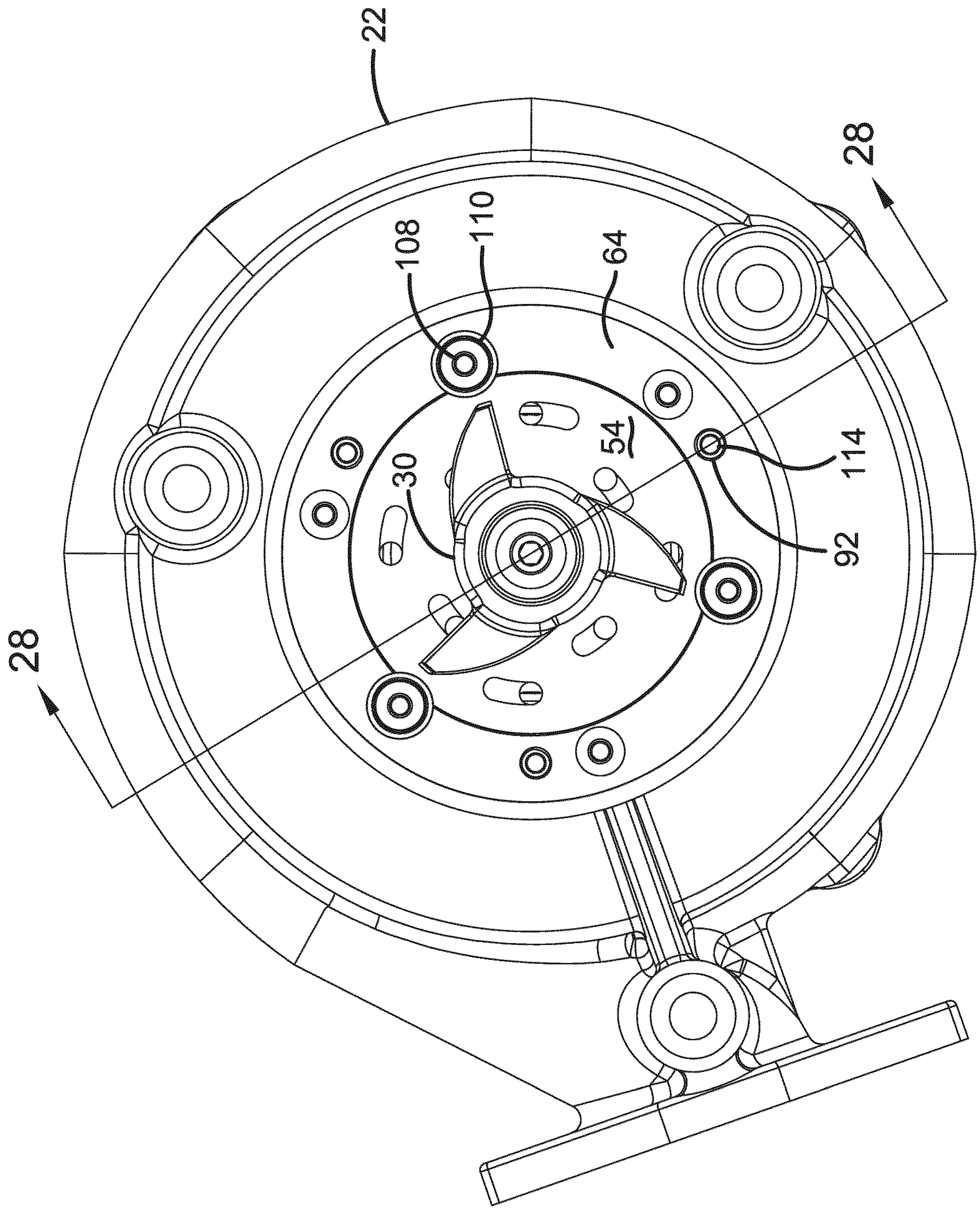
FIG. 27 is a bottom view of the pump in an operative position.
Figure 28:
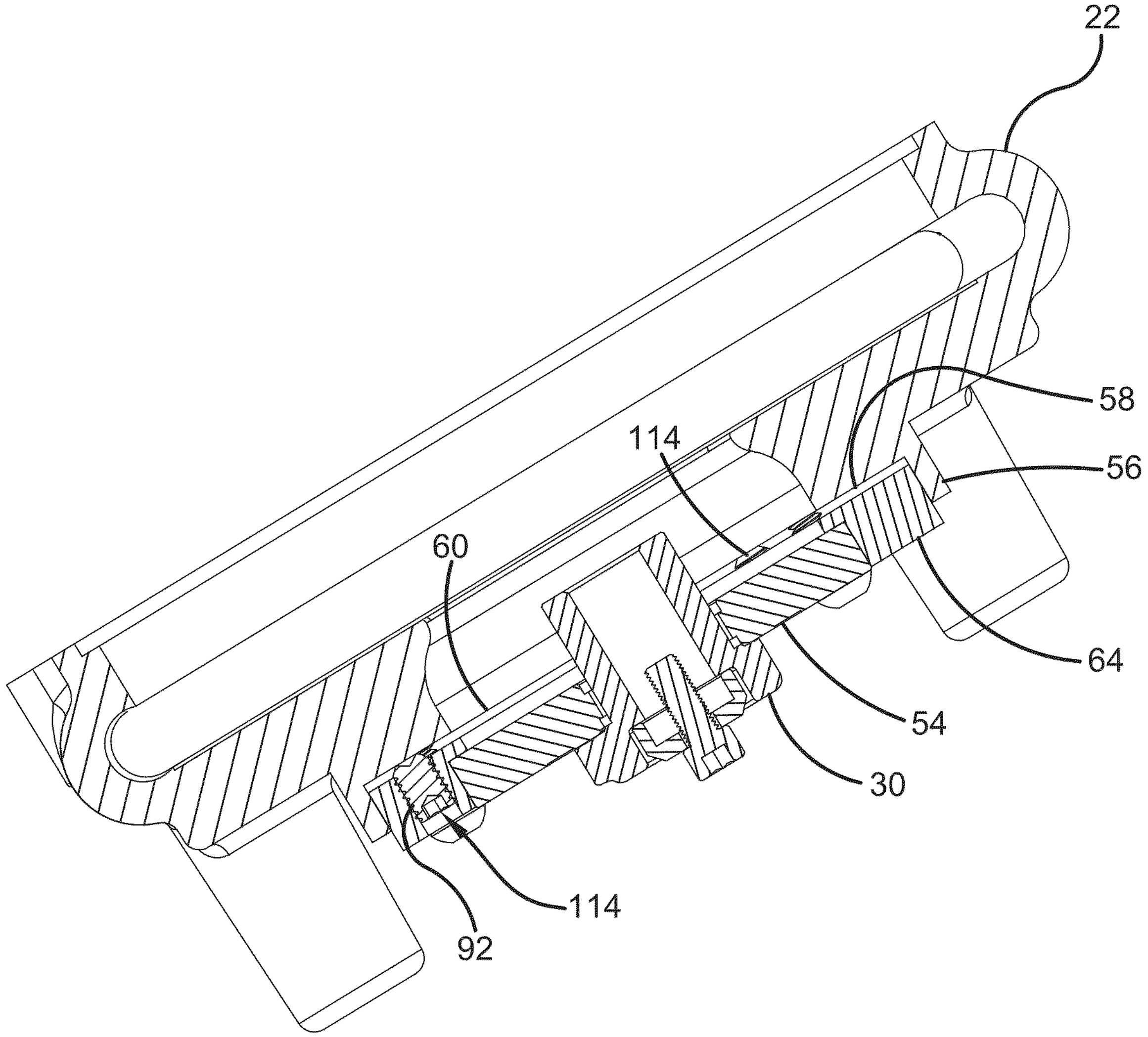
FIG. 28 is a cross-sectional view taken along line 28-28 in FIG. 27.

The exemplary arrangement further enables the distance between the blade edges and the slicer face to be adjusted. This is accomplished in the exemplary arrangement by the configuration of the mounting plate which releasably holds the slicer plate in fixed engagement therewith and the configuration of the lower housing 22. As shown in FIGS. 27 and 28 a respective adjusting screw 114 is positioned in each of the angularly spaced adjusting screw openings 72 of the mounting plate 64. In the exemplary arrangement the adjusting screw openings 72 and the adjusting screws 114 are threaded such that rotation of the adjusting screws causes the mounting plate to axially move and be selectively positioned relative to the axis and the blade edges 102 of the slicer 30. As used herein the terms axially and axial movement refer to being along a direction that is directly aligned with axis 38 as well as being along a direction that is parallel to axis 38.

In the exemplary arrangement the mounting plate 64 is positioned in the mounting plate recess 58 that is bounded by the circular wall 56. The adjusting screws 114 abuttingly engage the land surface 60. The rotational movement of the adjusting screws 114 in the openings 92 is operative to axially move the mounting plate 64 and the slicer plate 54 that is attached thereto, relative to the land surface. The angularly spaced adjusting screws also enable the slicer plate and slicer face to be selectively angularly positioned. This adjustment enables the clearance distance between the slicer face 80 and the cut point and first blade face 104 to be precisely set at the desired distance throughout slicer rotation to achieve slicing action of the solid materials likely to be encountered.

The exemplary arrangement enables such adjustment while assuring that the mounting plate 64 is held in firm fixed engagement with the housing. This is achieved through the use of releasable holding fasteners 116 that extend through the fastener openings 70 in the mounting plate 64. In the exemplary arrangement the releasable holding fasteners are bolts or other threaded fasteners that extend through the mounting plate 64 and threadably engage corresponding threaded openings 118 in the housing 22. As can be appreciated in the exemplary arrangement the holding fasteners 116 are changeable between a tighted fastened condition in which the mounting plate 64 is held in fixed engagement with the lower housing and a loosened condition. In the fastened condition of the fasteners 116 the adjusting screws 114 are held in firm abutting engagement with the land surface 60 and the adjusting screws cannot be turned to selectively axially position the mounting plate and the slicer plate. Changing the releasable fasteners 116 to the loosened condition provides axial play between the pump housing and the mounting plate. Thus in the loosened condition of the fasteners 160 the adjusting screws 114 may be rotationally adjusted to selective set the desired axial and angular position of the slicer face of the slicer plate.

Thus as can be appreciated in exemplary arrangements adjusting of the position of the slicer plate may include placing the holding fasteners 116 in a slightly loosened condition to enable rotational movement of the adjusting screws 114. Thereafter if the adjustment of the adjusting screws results in taking up all the available axial play in the movement of the mounting plate, the fasteners 116 may be further loosened to provide room for additional axial adjustment of the adjusting screws. Further because in the exemplary arrangement there are multiple angularly spaced holding fasteners and adjusting screws, the clearance distance across the slicer face 80 may be accurately set using a feeler gauge or other suitable clearance measuring device. As a result the proper clearance distance may be set for all areas across the slicer face between the slicer face and blade edges.

In the exemplary arrangement once the clearance distance for the blade edges has been set across the slicer plate, the mounting plate may be held in fixed engagement with the housing by tightening the holding fasteners 160. Tightening the holding fasteners sets the axial position of the mounting plate and slicer plate and holds the set clearance distance fixed to achieve the desired slicing action. Of course it should be understood that this arrangement and the fasteners described for adjusting and holding the slicer plate in position are exemplary. In other arrangements other configurations of fasteners both for releasably holding the slicer plate and adjusting the position thereof may be utilized.

For example in some alternative exemplary arrangements the slicer plate may be in threaded engagement with the slicer plate recess to provide axial adjustment of the slicer face. Such an arrangement may include suitable locking fasteners or other structures for holding the rotational and axial position of the slicer plate. Further in other exemplary arrangements rotatable adjustment structures with heads that provide a support for the slicer plate may be positioned in the land surface. Access openings in the slicer plate may be provided for accessing tool engaging recesses in the head structures with a suitable tool so that the rotation of the adjustment structures selectively axially (and angularly) position the slicer plate. Numerous different alternative adjustment structures may be utilized in exemplary arrangements.

Figure 32:
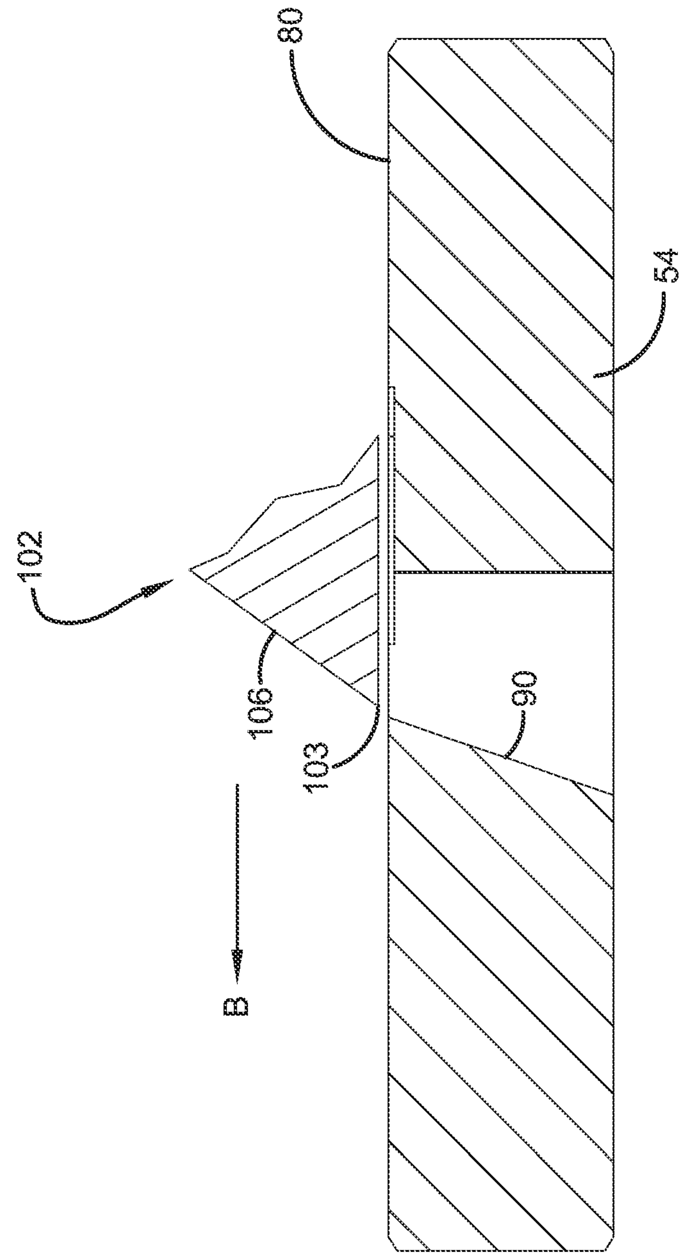
FIG. 32 is a radially transverse cross-sectional view similar to FIG. 31 but with the blade edge in axially outward relation of the slicer plate fluid opening.
Figure 33:
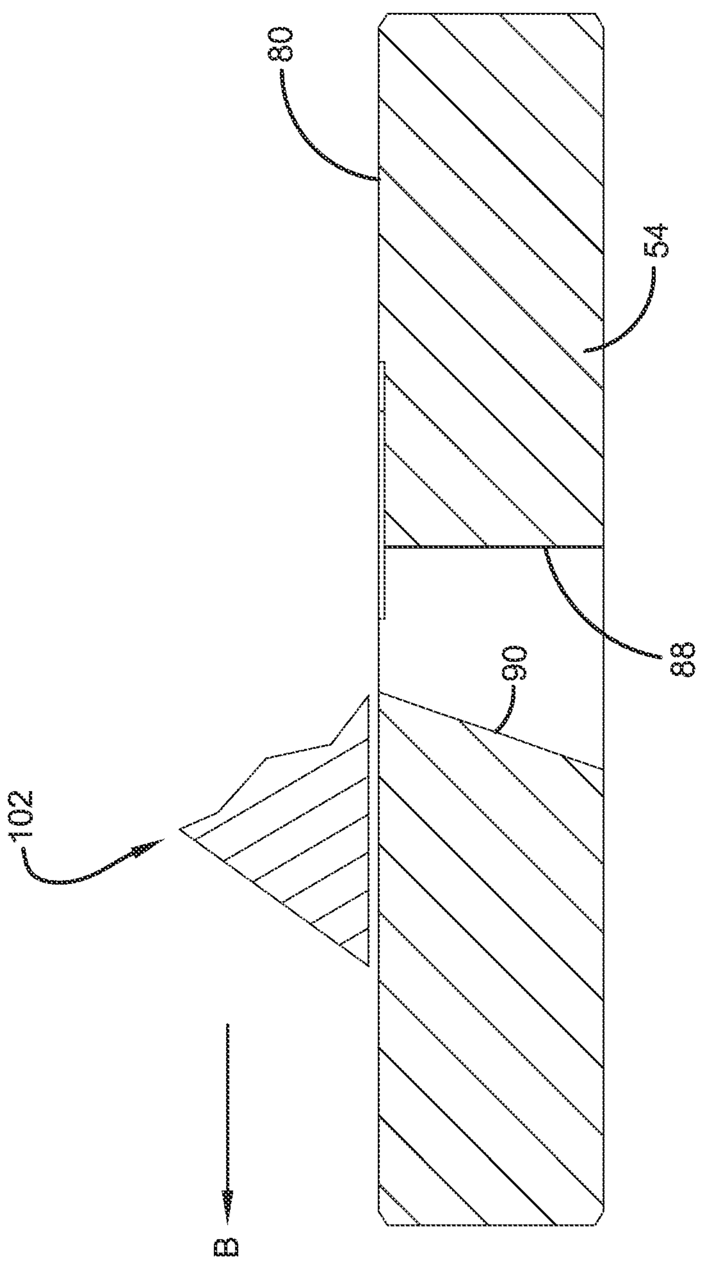
FIG. 33 is a radially transverse cross-sectional view similar to FIG. 31 showing the blade edge after passing the slicer plate fluid opening and in axially outward overlying relation of the generally planar slicer face.

The exemplary slicer assembly blade edge configuration may be configured to provide a scissors like slicing action at the slicer face 80 between the blade edge 102 and the second opening bounding wall portion 90 of each slicer plate fluid opening 78. As previously discussed and as is shown by FIG. 32 in some exemplary arrangements, the second opening bounding wall portion 90, which in the direction of travel, the cut point 103 of the blade edge 102 passes after outwardly passing over the first bounding wall 88, in radially transverse cross-section extends at an angle relative to the slicer face 80. The angle of the second opening bounding wall portion 90 is an acute angle relative to the face surface 80 which the blade edge passes immediately after the second bounding wall portion 90.

Further in some exemplary arrangements as shown for example in FIG. 32, the exemplary blade face 106 may extend at an angle to the plane of the slicer face 80 such that when the cut point 103 is in its closest position to the edge of the second opening bounding wall portion 90, the blade face 106 and the second opening bounding wall portion 90 at the slicer face 80, are substantially linearly aligned. As used herein the term substantially linearly aligned means that the two surfaces are in alignment +/−20°. This substantial linear alignment in some exemplary arrangements provides for positive slicing action of solid material between the blade edge and the surface bounding the second side of the fluid opening while also providing strength for the blade edge to cut hard solids without deformation or excessive wear. Of course it should be understood that this configuration and approach are exemplary and in other arrangements other approaches may be used.

In exemplary arrangements the pump 10 includes a single centrifugal impeller 42. However it should be understood that in other exemplary arrangements different impeller configurations as well as multiple impellers may be utilized. The exemplary pump arrangement provides for a single sufficiently large diameter circular impeller that produces sufficient pressure and flow at the pump outlet. In exemplary arrangements the configuration and area of the outlet opening 52 from the pump chamber is configured to provide sufficient pressure and flow at the operating speed of the motor that avoids overloading even when significant amounts of solid material are in the liquid being pumped. Further the diameter of the impeller is sufficient to provide angular momentum that enables the transmission of applied cutting and pumping force that is not adversely impacted by the presence of a substantial amount of suspended solids. Further as previously discussed, the exemplary arrangement which provides for only one cutting edge to extend across a slicer plate fluid opening at a time during slicer rotation, additionally reduces the risk of resistance to slicer rotation adversely impacting pump operation. Of course it should be understood that the exemplary structures and configurations of the arrangements shown and descried are exemplary and other arrangements having different structures and configurations may utilize the principles described herein.

In operation of the exemplary pump apparatus the motor 34 is operative responsive to the supply of electrical power to rotate the drive shaft 36. Rotation of the drive shaft rotates the impeller 42 and the slicer 30. Rotation of the impeller causes liquid to be drawn into the pump inlet 28 which is comprised of the plurality of slicer plate fluid openings 78. The rotation of the slicer 30 causes the blade edges 102 to slice solid material suspended in the liquid and that extends in the fluid openings. The liquid and sliced solid material are drawn through the inlet opening 50 of the pump chamber 40 by liquid flow caused by action of the impeller, and are discharged from the pump chamber through the outlet opening 52. The liquid and sliced solid material are then passed out of the pump chamber to the pump outlet 32.

Thus the exemplary arrangements described herein achieve improved operation, eliminate difficulties encountered in the use of prior devices and systems, and attain the useful results that have been described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations herein are by way of examples, and the new and useful features, arrangement and/or configurations are not limited to only those that have been described.

It should further be understood that features and/or relationships associated with one described arrangement can be combined with features and/or relationships from another described arrangement. That is, features and/or relationships from various arrangements can be combined to produce further arrangements. The new and useful scope of the disclosure is not limited only to the exact arrangements that have been shown and described.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

I claim:

1. A pump apparatus comprising:

a housing, a motor, wherein the motor is in operative connection with the housing, wherein the motor is in operative connection with a drive shaft, wherein the drive shaft extends along an axis, a pump chamber, wherein the pump chamber is positioned within the housing, wherein the pump chamber includes an axially extending inlet opening configured to enable liquid to flow into the pump chamber, and an outlet opening configured to enable liquid to flow out of the pump chamber, an impeller, wherein the impeller is rotatably positioned in the pump chamber, wherein the impeller is in operative connection with the drive shaft and is rotatable about the axis, a slicer plate, wherein the slicer plate extends in axially disposed outward overlying relation of the inlet opening, wherein the slicer plate includes a planar slicer face, wherein the slicer face is in a facing direction away from the inlet opening, an axially aligned slicer drive opening, wherein the drive opening extends through the slicer plate, at least one slicer plate fluid opening, wherein the at least one slicer plate fluid opening extends through the slicer plate at a location disposed radially away from the slicer drive opening, a plurality of rotatable adjusting screws, wherein each respective adjusting screw is in operative connection with the slicer plate and the housing, wherein rotational movement of each adjusting screw is operative to axially position the slicer plate relative to the housing, a slicer, wherein the slicer extends in outwardly overlying relation of the slicer face, is in operatively engaged fixed rotational connection with the drive shaft, whereby the slicer is in operative connection with the drive shaft through the slicer drive opening, includes at least one blade edge, wherein the at least one blade edge extends radially outward from the axis and is positioned in immediately adjacent relation to the slicer face, wherein rotation of the adjusting screws is operative to selectively adjust a clearance distance between the slicer face and the at least one blade edge in a clearance direction perpendicular to the slicer face, wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening.

2. The apparatus according to claim 1 and further comprising an annular mounting plate, wherein the mounting plate is in fixed operative connection with the housing, wherein the slicer plate is in releasably fixed connection with the mounting plate, whereby the slicer plate is replaceable.

3. The apparatus according to claim 1 and further comprising an annular mounting plate, wherein the mounting plate is in fixed operative connection with the housing, wherein the mounting plate includes an axially extending slicer plate recess, wherein the slicer plate recess is bounded axially inwardly by a generally continuous radially inward extending annular ledge, wherein the slicer plate is in releasably fixed connection with the mounting plate, and in an operative position of the slicer plate, an inner slicer plate surface opposed of the slicer face is in engaged abutting relation with the annular ledge, at least one releasable fastener, wherein in the at least one releasable fastener is operative to hold the slicer plate in the operative position.

4. The apparatus according to claim 1 wherein the housing includes a generally continuous radially extending annular land surface, wherein the adjusting screws are angularly spaced from one another, wherein rotation of the adjusting screws is operative to cause the slicer face plate to be selectively axially and angularly positioned relative to the land surface.

5. The apparatus according to claim 1 wherein the housing includes a generally continuous radially extending annular land surface, wherein liquid that has passed through the at least one slicer plate fluid opening passes radially inwardly of the land surface and axially toward the inlet opening, and further comprising:

a plurality of threaded openings, wherein each threaded opening is angularly spaced from each other threaded opening and is in fixed operative connection with the slicer plate, wherein each adjusting screw is in threaded engaged relation with a respective threaded opening, and is in abutting relation with the land surface, wherein rotation of the adjusting screws is operative to cause the slicer face to be selectively axially and angularly positioned relative to the land surface and the at least one slicer blade edge.

6. The apparatus according to claim 1 wherein the slicer plate includes a plurality of angularly spaced slicer plate fluid openings, wherein the at least one blade edge extends across no more than one slicer plate fluid opening in any rotational position of the slicer.

7. The apparatus according to claim 1 wherein the slicer plate includes a plurality of angularly and radially spaced slicer plate fluid openings, wherein the slicer includes a plurality of blade edges, wherein no more than one slicer blade edge extends across a slicer plate fluid opening in any rotational position of the slicer.

8. The apparatus according to claim 1 wherein the slicer plate includes a plurality of angularly and radially spaced slicer plate fluid openings, wherein the slicer includes a central hub, a plurality of angularly spaced blade edges, wherein each blade edge extends radially outward from the central hub, in a common blade edge plane with each other blade edge, and arcuately such that the blade edge is further set back in a direction opposed of a slicer rotation direction with increased radial distance outward from the hub, wherein no more than one slicer blade edge extends across a slicer plate fluid opening in any rotational position of the slicer.

9. The apparatus according to claim 1 wherein in radially transverse cross-section each at least one blade edge includes a cut point, a first blade face that extends from the cut point generally parallel to the slicer face, and a second blade face that extends from the cut point and at an acute angle to the slicer face.

10. The apparatus according to claim 1 wherein rotation of the adjusting screws is operative to selectively angularly position the slicer face relative a radial direction from the axis in any one of a plurality of angular positions.

11. A pump apparatus comprising:

a motor, a drive shaft, wherein the drive shaft is in operative connection with the motor, and extends along an axis a housing, wherein the housing includes a pump chamber, wherein the pump chamber includes an axially extending inlet opening configured to enable liquid to axially flow into the pump chamber, and an outlet opening configured to enable liquid to flow out of the pump chamber, an impeller, wherein the impeller is positioned in the pump chamber, is in operative connection with the drive shaft, and is rotatable about the axis, a slicer plate, wherein the slicer plate extends in axially disposed outward overlying relation of the inlet opening, includes at least one slicer plate fluid opening therethrough, wherein the at least one slicer plate fluid opening is radially disposed away from the axis, and configured to enable liquid to pass therethrough in a direction parallel to the axis, includes a generally planar slicer face, wherein the slicer face extends perpendicular to the axis, includes the at least one slicer plate fluid opening therein, and extends in a facing direction away from the inlet opening, is movably mounted in operative connection with the housing, wherein the slicer face is selectively axially positionable in each of a plurality of axial positions relative to the housing and held in fixed engagement with the housing in each of the plurality of axial positions, a slicer, wherein the slicer extends in outwardly overlying relation of the slicer plate, is in operatively engaged connection with the drive shaft, includes at least one blade edge, wherein the at least one blade edge extends radially outward from the axis, is positioned in immediately adjacent relation to the slicer face, and is disposed a clearance distance from the slicer face in a direction parallel to the axis, wherein selectively axially positioning of the slicer face relative to the housing is operative to selectively vary the clearance distance, of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening.

12. The apparatus according to claim 11 and further comprising a plurality of angularly spaced, rotatable adjusting screws, wherein each rotatable adjusting screw is in operative connection with the slicer plate and the housing, wherein rotational movement of the adjusting screws is operative to selectively adjust the clearance distance and an angle of the slicer face relative to a radial direction from the axis.

13. The apparatus according to claim 11 wherein the slicer plate includes an axially aligned slicer drive opening that extends through the slicer plate, wherein the slicer is in operative connection with the drive shaft through the slicer drive opening, wherein each of the at least one slicer plate fluid openings is radially disposed away from the slicer drive opening.

14. The apparatus according to claim 11 wherein the slicer plate is releasably mounted in operative connection with the housing, whereby the slicer plate is replaceable.

15. A pump apparatus comprising:

a housing, a motor, wherein the motor is in operative connection with the housing, wherein the motor is in operative connection with a drive shaft, wherein the drive shaft extends along an axis, a pump chamber, wherein the pump chamber is positioned within the housing, wherein the pump chamber includes an axially extending inlet opening configured to enable liquid to flow into the pump chamber, and an outlet opening configured to enable liquid to flow out of the pump chamber, an impeller, wherein the impeller is rotatably positioned in the pump chamber, wherein the impeller is in operative connection with the drive shaft and is rotatable about the axis, a slicer plate, wherein the slicer plate extends in axially disposed outward overlying relation of the inlet opening, wherein the slicer plate includes a planar slicer face, wherein the slicer face is in a facing direction away from the inlet opening, an axially aligned slicer drive opening, wherein the drive opening extends through the slicer plate, at least one slicer plate fluid opening, wherein the at least one slicer plate fluid opening extends through the slicer plate at a location disposed radially away from the slicer drive opening, an annular mounting plate, wherein the mounting plate is in fixed operative connection with the housing, wherein the mounting plate includes a slicer plate recess, wherein the slicer plate is releasably positioned in the slicer plate recess, at least one fastener, wherein the at least one fastener is releasably engageable with the mounting plate, wherein the at least one fastener is in operative connection with an overlying portion, wherein in a holding position of the at least one fastener the overlying portion is in overlying relation of an outer peripheral portion of the slicer face, wherein the slicer plate is held in releasably fixed connection with the mounting by the overlying portion, a plurality of rotatable adjusting screws, wherein each respective adjusting screw is in operative connection with the slicer plate and the housing, wherein rotational movement of each adjusting screw is operative to selectively axially position the slicer plate relative to the housing, a slicer, wherein the slicer extends in outwardly overlying relation of the slicer face, is in operatively engaged fixed rotational connection with the drive shaft, whereby the slicer is in operative connection with the drive shaft through the slicer drive opening, includes at least one blade edge, wherein the at least one blade edge extends radially outward from the axis and is positioned in immediately adjacent relation to the slicer face, wherein rotation of the adjusting screws is operative to selectively adjust a clearance distance between the slicer face and the at least one blade edge in a clearance direction perpendicular to the slicer face, wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening.

16. A pump apparatus comprising:

a housing, a motor, wherein the motor is in operative connection with the housing, wherein the motor is in operative connection with a drive shaft, wherein the drive shaft extends along an axis, a pump chamber, wherein the pump chamber is positioned within the housing, wherein the pump chamber includes an axially extending inlet opening configured to enable liquid to flow into the pump chamber, and an outlet opening configured to enable liquid to flow out of the pump chamber, an impeller, wherein the impeller is rotatably positioned in the pump chamber, wherein the impeller is in operative connection with the drive shaft and is rotatable about the axis, a slicer plate, wherein the slicer plate extends in axially disposed outward overlying relation of the inlet opening, wherein the slicer plate includes a planar slicer face, wherein the slicer face is in a facing direction away from the inlet opening, an axially aligned slicer drive opening, wherein the drive opening extends through the slicer plate, at least one slicer plate fluid opening, wherein the at least one slicer plate fluid opening extends through the slicer plate at a location disposed radially away from the slicer drive opening, wherein the housing includes a generally continuous radially extending annular land surface, wherein liquid that has passed through the at least one slicer plate fluid opening passes radially inwardly of the land surface and axially toward the inlet opening, an annular mounting plate, wherein the mounting plate is in fixed operative connection with the slicer plate, extends in axially centered relation, extends in axially outwardly overlying relation with the land surface of the housing, and includes a plurality of threaded openings, wherein each threaded opening is in fixed operative connection with the slicer plate, a plurality of rotatable adjusting screws, wherein each respective adjusting screw is in threaded engaged relation with a respective threaded opening, and in abutting relation with the land surface, a slicer, wherein the slicer
extends in outwardly overlying relation of the slicer face,
is in operatively engaged fixed rotational connection with the drive shaft, whereby the slicer is in operative connection with the drive shaft through the slicer drive opening,
includes at least one blade edge, wherein the at least one blade edge extends radially outward from the axis and is positioned in immediately adjacent relation to the slicer face,
wherein rotation of the adjusting screws is operative to cause the slicer plate to be selectively axially positioned relative to the land surface and to selectively adjust a clearance distance between the slicer face and the at least one blade edge in a clearance direction perpendicular to the slicer face,
wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening.

17. The apparatus according to claim 16
wherein the annular mounting plate
includes a slicer plate recess, wherein the slicer plate is removably mounted in the slicer plate recess.

18. The apparatus according to claim 16
wherein the annular mounting plate includes a plurality of fastener openings therethrough,
and further comprising:
a plurality of releasable fasteners,
wherein each of the fastener openings is configured to receive a respective releasable fastener,
wherein each releasable fastener in a fastened condition is operative to hold the mounting plate in fixed operative engagement with the housing, and in a loosened condition is operative to enable axial movement of the mounting plate relative to the housing,
wherein with the plurality of fasteners in a loosened condition, rotation of the adjusting screws is operative to cause the slicer plate to be selectively axially positioned relative to the land surface and the at least one blade edge, whereby the clearance distance is adjusted, and
wherein changing the fasteners from the loosened condition to the fastened condition is operative to cause the clearance distance to be held fixed.

19. The apparatus according to claim 16
wherein the annular mounting plate
includes an annular inner mounting plate surface that is disposed away from and in axially outwardly overlying relation with the land surface of the housing, and
includes a plurality of fastener openings,
and further comprising:
a plurality of releasable fasteners,
wherein each of the fastener openings is configured to receive a respective releasable fastener therein,
wherein each releasable fastener in a fastened condition is operative to hold the mounting plate in fixed operative engagement with the housing, and in a loosened condition is operative to enable axial movement of the mounting plate relative to the housing,
wherein with the plurality of fasteners in a loosened condition, rotation of the adjusting screws is operative to cause a change in distance between the land surface and the annular inner mounting plate surface wherein the slicer plate is caused to be axially positioned relative to the land surface and the at least one blade edge, whereby the clearance distance is adjusted, and
wherein a change of the fasteners from the loosened condition to the fastened condition is operative to cause the clearance distance to be held fixed.

20. The apparatus according to claim 16
wherein the annular mounting plate
includes an annular inner mounting plate surface,
wherein the annular inner mounting plate surface is disposed away from and extends in axially outwardly overlying relation with the land surface of the housing,
wherein rotation of the adjusting screws is operative to vary a distance between the annular inner mounting plate surface and the land surface, wherein the slicer face is caused to be axially selectively positioned relative to the at least one blade edge.

21. A pump apparatus comprising:
a housing,
a motor, wherein the motor is in operative connection with the housing,
wherein the motor is in operative connection with a drive shaft, wherein the drive shaft extends along an axis,
a pump chamber, wherein the pump chamber is positioned within the housing,
wherein the pump chamber includes an axially extending inlet opening configured to enable liquid to flow into the pump chamber, and an outlet opening configured to enable liquid to flow out of the pump chamber,
an impeller, wherein the impeller is rotatably positioned in the pump chamber,
wherein the impeller is in operative connection with the drive shaft and is rotatable about the axis,
a slicer plate, wherein the slicer plate extends in axially disposed outward overlying relation of the inlet opening,
wherein the slicer plate includes
a planar slicer face, wherein the slicer face is in a facing direction away from the inlet opening,
an axially aligned slicer drive opening, wherein the drive opening extends through the slicer plate,
at least one slicer plate fluid opening, wherein the at least one slicer plate fluid opening extends through the slicer plate at a location disposed radially away from the slicer drive opening,
a plurality of rotatable adjusting screws, wherein each respective adjusting screw
is in operative connection with the slicer plate and the housing,
wherein rotational movement of each adjusting screw is operative to axially position the slicer plate relative to the housing,
a slicer, wherein the slicer
extends in outwardly overlying relation of the slicer face,
is in operatively engaged fixed rotational connection with the drive shaft, whereby the slicer is in operative connection with the drive shaft through the slicer drive opening, includes at least one blade edge, wherein the at least one blade edge extends radially outward from the axis and is positioned in immediately adjacent relation to the slicer face, wherein rotation of the adjusting screws is operative to selectively adjust a clearance distance between the slicer face and the at least one blade edge in a clearance direction perpendicular to the slicer face, wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening, wherein in radially transverse cross-section each at least one blade edge includes a cut point, a first blade face that extends from the cut point generally parallel to the slicer face, and a second blade face that extends from the cut point and at an acute angle to the slicer face, wherein the at least one slicer plate fluid opening includes a first fluid opening, wherein the first fluid opening in radially transverse cross-section includes a first opening bounding wall portion and a second opening bounding wall portion, wherein each of the first and second opening bounding wall portions extend within the slicer plate and at least the second opening bounding wall portion extends to the slicer face, wherein during rotation of the slicer the cut point axially outwardly passes the first opening bounding wall portion before the cut point outwardly passes the second opening bounding wall portion, wherein the second opening bounding wall portion extends at the slicer face, at an acute angle relative to a portion of the slicer face that the cut point axially outwardly passes immediately after the second opening bounding wall portion.

22. The apparatus according to claim 21 wherein the second opening bounding wall portion extends at an obtuse angle relative to the first opening bounding wall.

23. The apparatus according to claim 21 wherein in radially transverse cross section the second opening bounding wall portion extends to the slicer face, and wherein the at least one slicer plate fluid opening further includes a trough, wherein the trough extends inwardly in the slicer face from a first trough end to the first opening bounding wall portion, wherein the cut point axially outwardly passes the first trough end before the first opening bounding wall portion.

24. The apparatus according to claim 21 wherein in radially transverse cross-section the second opening bounding wall portion extends to the slicer face, wherein the at least one slicer plate fluid opening further includes a trough, wherein the trough extends inwardly in the slicer face from a first trough end to the first opening bounding wall portion, has as an arcuate shape, and has a radial width that corresponds to a radial width of the first fluid opening at the slicer face, wherein the cut point axially outwardly passes the first trough end before the first opening bounding wall portion.

25. The apparatus according to claim 21 wherein in radially transverse cross-section each of the first and second opening bounding wall portions extend to the slicer face, and wherein when the cut point axially outwardly passes the second opening bounding wall portion, the second blade face and the second opening bounding wall portion are substantially linearly aligned.

26. The apparatus according to claim 21 wherein the at least one slicer plate fluid opening includes a plurality of angularly disposed and radially disposed first fluid openings, wherein in radially transverse cross-section the first and second opening bounding wall portions of each first fluid opening extend to the slicer face.

27. A pump apparatus comprising:

a motor, a drive shaft, wherein the drive shaft is in operative connection with the motor, and extends along an axis a housing, wherein the housing includes a pump chamber, wherein the pump chamber includes an axially extending inlet opening configured to enable liquid to axially flow into the pump chamber, and an outlet opening configured to enable liquid to flow out of the pump chamber, an impeller, wherein the impeller is positioned in the pump chamber, is in operative connection with the drive shaft, and is rotatable about the axis, a slicer plate, wherein the slicer plate extends in axially disposed outward overlying relation of the inlet opening, includes at least one slicer plate fluid opening therethrough, wherein the at least one slicer plate fluid opening is radially disposed away from the axis, and configured to enable liquid to pass therethrough in a direction parallel to the axis, includes a generally planar slicer face, wherein the slicer face extends perpendicular to the axis, includes the at least one slicer plate fluid opening therein, and extends in a facing direction away from the inlet opening, is movably mounted in operative connection with the housing, wherein the slicer face is selectively axially positionable relative to the housing, a slicer, wherein the slicer extends in outwardly overlying relation of the slicer plate, is in operatively engaged connection with the drive shaft, includes at least one blade edge, wherein the at least one blade edge extends radially outward from the axis, is positioned in immediately adjacent relation to the slicer face, and is disposed a clearance distance from the slicer face in a direction parallel to the axis, wherein axially positioning of the slicer plate relative to the housing is operative to selectively vary the clearance distance, wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening, wherein in radially transverse cross-section each at least one blade edge includes a cut point, a first blade face that extends from the cut point generally parallel to the slicer face, and a second blade face that extends from the cut point at an acute angle to the slicer face, wherein each slicer plate fluid opening includes in radially transverse cross-section a first opening bounding wall portion and the second opening bounding wall portion, wherein each of the first and second opening bounding wall portions extend within the slicer plate and at least the second opening bounding wall portion extends to the slicer face, wherein during rotation of the slicer the cut point axially outwardly passes the first opening bounding wall portion before the cut point outwardly passes the second opening bounding wall portion, wherein the second opening bounding wall portion at the slicer face, extends at an acute angle relative to a portion of the slicer face which the cut point axially outwardly passes immediately after the cut point axially outwardly passes second opening bounding wall portion.

28. The apparatus according to claim 27 wherein in radially transverse cross-section each of the first and second opening bounding wall portions extend within the slicer plate and to the slicer face, wherein the second opening bounding wall portion extends at an acute angle at the slicer face, relative to a portion of the slicer face that the cut point axially outwardly passes immediately after the second opening bounding wall portion.

29. A pump apparatus comprising:

a housing, a motor, wherein the motor is in operative connection with the housing, wherein the motor is in operative connection with a drive shaft, wherein the drive shaft extends along an axis, a pump chamber, wherein the pump chamber is positioned within the housing, wherein the pump chamber includes an axially extending inlet opening configured to enable liquid to flow into the pump chamber, and an outlet opening configured to enable liquid to flow out of the pump chamber, an impeller, wherein the impeller is rotatably positioned in the pump chamber, wherein the impeller is in operative connection with the drive shaft and is rotatable about the axis, a slicer plate, wherein the slicer plate extends in axially disposed outward overlying relation of the inlet opening, wherein the slicer plate includes a planar slicer face, wherein the slicer face is in a facing direction away from the inlet opening, an axially aligned slicer drive opening, wherein the drive opening extends through the slicer plate, at least one slicer plate fluid opening, wherein the at least one slicer plate fluid opening extends through the slicer plate at a location disposed radially away from the slicer drive opening, a plurality of rotatable adjusting screws, wherein each respective adjusting screw is in operative connection with the slicer plate and the housing, wherein rotational movement of each adjusting screw is operative to cause the slicer plate to be selectively axially movable relative to the housing to a plurality of different axial positions, and to be held fixed relative to the housing in an axial position to which the slicer plate is selectively axially moved, wherein movement of each adjusting screw in a first rotational direction is operative to cause the slicer plate to move in a first axial direction relative to the housing and movement of each adjusting screw in a second rotational direction opposed of the first rotational direction is operative to cause the slicer plate to move in a second axial direction relative to the housing opposed of the first axial direction, a slicer, wherein the slicer extends in outwardly overlying relation of the slicer face, is in operatively engaged fixed rotational connection with the drive shaft, whereby the slicer is in operative connection with the drive shaft through the slicer drive opening, includes at least one blade edge, wherein the at least one blade edge extends radially outward from the axis and is positioned in immediately adjacent relation to the slicer face, wherein rotation of the adjusting screws is operative to selectively set a clearance distance between the slicer face and the at least one blade edge in a clearance direction perpendicular to the slicer face, wherein the adjusting screws after rotation are operative to hold fixed the set clearance distance, wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening.

30. A pump apparatus comprising:

a motor, a drive shaft, wherein the drive shaft is in operative connection with the motor, and
extends along an axis
a housing, wherein the housing includes a pump chamber, wherein the pump chamber
includes an axially extending inlet opening configured to enable liquid to axially flow into the pump chamber, and
an outlet opening configured to enable liquid to flow out of the pump chamber,
an impeller, wherein the impeller
is positioned in the pump chamber,
is in operative connection with the drive shaft, and
is rotatable about the axis,
a slicer plate, wherein the slicer plate
extends in axially disposed outward overlying relation of the inlet opening,
includes at least one slicer plate fluid opening therethrough, wherein the at least one slicer plate fluid opening
is radially disposed away from the axis, and
configured to enable liquid to pass therethrough in a direction parallel to the axis,
includes a generally planar slicer face, wherein the slicer face
extends perpendicular to the axis,
includes the at least one slicer plate fluid opening therein, and
extends in a facing direction away from the inlet opening,
is movably mounted in operative connection with the housing, wherein the slicer plate is selectively axially positionable relative to the housing in each of a plurality of disposed axial positions and is selectively held fixed in each of the plurality of axial positions,
a slicer, wherein the slicer
extends in outwardly overlying relation of the slicer plate,
is in operatively engaged connection with the drive shaft,
includes at least one blade edge, wherein the at least one blade edge
extends radially outward from the axis,
is positioned in immediately adjacent relation to the slicer face, and
is disposed a clearance distance from the slicer face in a direction parallel to the axis, wherein selectively axially positioning of the slicer plate relative to the housing is operative to selectively set the clearance distance,
wherein rotation of the drive shaft responsive to the motor is operative to cause rotation of the impeller and the slicer, whereby the impeller is operative to cause liquid flow from outside the housing, through the at least one slicer plate fluid opening, through the inlet opening and the pump chamber, and outward through the outlet opening while the at least one blade edge of the slicer is operative to slice solid material that extends in the at least one fluid opening.

* * * * *